(12) United States Patent
Tanaka et al.

(10) Patent No.: US 8,123,250 B2
(45) Date of Patent: Feb. 28, 2012

(54) AIRBAG APPARATUS

(75) Inventors: Koki Tanaka, Aichi-ken (JP); Masanori Oyabu, Aichi-ken (JP); Kazuhiro Nakayama, Aichi-ken (JP); Tetsuya Ogata, Aichi-ken (JP); Hirokazu Matsuura, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 294 days.

(21) Appl. No.: 12/588,139

(22) Filed: Oct. 6, 2009

(65) Prior Publication Data
US 2010/0096841 A1 Apr. 22, 2010

(30) Foreign Application Priority Data

Oct. 20, 2008 (JP) .................................. 2008-269729

(51) Int. Cl.
*B60R 21/16* (2006.01)
(52) U.S. Cl. ................ 280/743.1; 280/728.2; 280/730.1
(58) Field of Classification Search ............... 280/728.2, 280/730.1, 743.1
See application file for complete search history.

(56) References Cited

U.S. PATENT DOCUMENTS

| 7,226,077 B2 * | 6/2007 | Abe ............................. 280/736 |
| 7,934,750 B2 * | 5/2011 | Naruse et al. ............... 280/743.1 |
| 2005/0023809 A1 * | 2/2005 | Yamamoto et al. ........... 280/731 |
| 2008/0116669 A1 * | 5/2008 | Adachi et al. ............... 280/730.1 |

FOREIGN PATENT DOCUMENTS

JP A-2008-120290 5/2008

\* cited by examiner

*Primary Examiner* — Ruth Ilan
(74) *Attorney, Agent, or Firm* — Posz Law Group, PLC

(57) ABSTRACT

An airbag apparatus includes an airbag that includes a bag body provided with an insert hole for receiving an inflator and a sealing cloth arranged to cover a peripheral area of the insert hole. The sealing cloth includes on the location corresponding to the insert hole a through hole for receiving the inflator. The sealing cloth further includes around the through hole a slit that encircles the through hole generally wholly in a circumferential direction and enables relative slip movement between a peripheral area of the through hole on the sealing cloth and the peripheral area of the insert hole on the bag body in generally radial directions about the through hole.

6 Claims, 20 Drawing Sheets

Enlanged section taken along lineA-A

Enlanged section taken along lineB-B

AIRBAG APPARATUS

The Present application claims priority from Japanese Patent Application No. 2008-269729 of Tanaka et al., filed on Oct. 20, 2008, the disclosure of which is hereby incorporated into the present application by reference.

BACKGROUND OF THE INVENTION

1. Field of the Invention

The present invention relates to an airbag apparatus mountable on a vehicle that includes an inflatable airbag and an inflator that supplies inflation gas to the airbag. More particularly, the invention relates to an airbag apparatus suitable for use as a knee-protecting or a side impact airbag apparatus in which an inflator is put through an insert hole of an airbag such that a first end of the inflator is located outside of the airbag whereas a second end of the inflator having gas discharge ports is housed inside the airbag.

2. Description of Related Art

In a knee-protecting or a side impact airbag apparatus, an airbag is secured to an installation location at its portion dislocated from an insert hole for receiving an inflator. In this kind of airbag apparatus, it is inevitable that a tensile force acts on a peripheral area of the insert hole which is positioned by an end of the inflator. Upon airbag deployment, since the inflator secured to the installation location positions the peripheral area of the insert hole, a portion of the peripheral area on the side of action direction of the tensile force is pulled and thereby causing a gap between the portion of the peripheral area on the side of the action direction of the tensile force and the outer circumference of the inflator. JP 2008-120290 discloses an airbag apparatus intended to solve the above problem. This airbag apparatus includes an airbag body provided with an insert hole and a flexible seal cloth applied to a peripheral area of the insert hole on an inner circumference of the bag body. The seal cloth includes on a location corresponding to the insert hole a fitting hole for receiving the inflator, and is provided with a slack on part of the peripheral area of the fitting hole on which a tensile force acts upon airbag deployment so that gas seal is secured at the periphery of the insert hole of the bag body.

However, this configuration that the slack of the seal cloth is formed only on the side of the peripheral area of the fitting hole on which a tensile force acts can fail to deal with such an event that the direction of action of the tensile force varies during airbag deployment, for instance orthogonally. In such an event, a gap can still be formed between the inner circumference of the insert hole and the outer circumference of the inflator. Therefore, it is desired to further improve gas seal of the periphery of the insert hole.

SUMMARY OF THE INVENTION

An object of the present invention is to provide an airbag apparatus that has improved gas seal at an insert hole of an airbag for receiving an inflator in order to prevent gas leak from a gap which would otherwise be formed between the airbag and inflator due to a tensile force exerted upon airbag deployment.

The object of the invention is attained by an airbag apparatus having a following structure:

The airbag apparatus includes a housing, an inflator secured to the housing and having a generally columnar shape, the inflator including at a first end discharge ports for emission of inflation gas, and an airbag secured to and housed in the housing in a folded up configuration. The airbag includes a bag body that constitutes an outer circumferential wall of the airbag and is inflatable with inflation gas. The bag body includes an insert hole that receives the inflator, such that a region of the inflator on the side of the first end provided with the discharge ports is housed inside the airbag whereas a region of the inflator on the side of a second end projects out of the insert hole. The region of the inflator on the side of the first end secures the bag body to the housing. The airbag further includes a sealing cloth having flexibility and so connected to the bag body as to cover a peripheral area of the insert hole on an inner circumference of the bag body for providing gas seal at the insert hole of the bag body. The sealing cloth includes a through hole for receiving the inflator on a location corresponding to the insert hole of the bag body and a slit that encircles the through hole generally wholly in a circumferential direction and enables relative slip movement between a peripheral area of the through hole on the sealing cloth and the peripheral area of the insert hole on the bag body in generally radial directions about the through hole.

In the airbag apparatus of the invention, when the inflator emits inflation gas from the first end which is inserted into the airbag and provided with discharge ports, the airbag emerges from the housing for deployment. At this time, since the peripheral area of the insert hole on the bag body is positioned by the first end region of the inflator that secures the airbag to the housing, the peripheral area is subjected to a tensile force acting towards the deployment direction of the airbag from an area of the bag body secured to the housing, which causes a gap between the outer circumference of the inflator and a portion of the inner circumference of the insert hole on the side of the action direction of the tensile force.

However, the airbag of the airbag apparatus of the invention includes a sealing cloth arranged to cover the peripheral area of the insert hole on the inner circumference of the bag body, and the sealing cloth includes around the through hole for receiving the inflator a slit that encircles the through hole generally wholly in a circumferential direction. With this configuration, even in the event that the tension force acts on the peripheral area of the insert hole toward the deployment direction of the airbag and tries to pull the sealing cloth as well, the sealing cloth deals with the tensile force by opening the slit, and the peripheral area of the through hole of the sealing cloth located between the slit and the through hole is not pulled by the tensile force and stays in close contact with the outer circumference of the inflator. That is, the peripheral area of the through hole of the sealing cloth slips relative to the peripheral are of the insert hole of the bag body. As a result, the sealing cloth covers the gap formed between the inner circumference of the insert hole and the outer circumference of the inflator by the peripheral area of the through hole. Moreover, since the slit is formed to encircle the through hole generally wholly in a circumferential direction, even in the event that the direction of action of the tensile force varies during airbag deployment, for example changes toward a direction generally orthogonal to the deployment direction of the airbag, the peripheral area of the through hole is not pulled by the tensile force and covers a gap formed between the inner circumference of the insert hole and the outer circumference of the inflator. As a consequence, the insert hole of the bag body is prevented from leaking inflation gas which has once flown into the bag body, and thus improving gas seal property in the periphery of the insert hole.

Therefore, the airbag apparatus of the invention has improved gas seal at the insert hole of the airbag for receiving an inflator and prevents gas leak from a gap which would otherwise be formed between the airbag and inflator due to a tensile force exerted upon airbag deployment.

In order to enable relative slip movement between the peripheral area of the through hole on the sealing cloth and the peripheral area of the insert hole on the bag body in generally radial directions about the through hole, it will also be appreciated to employ a sealing cloth that is connected to the bag body at at least three portions on generally radial locations about the through hole and includes a slack on each hem extending between the connected portions.

Also with this configuration, even in the event that the tension force acts on the peripheral area of the insert hole toward the deployment direction of the airbag and tries to pull the sealing cloth as well, the sealing cloth deals with the tensile force by stretching out in such a manner as to take up any of the slacks, such that the peripheral area of the through hole of the sealing cloth is not pulled by the tensile force and stays in close contact with the outer circumference of the inflator body. As a result, the sealing cloth covers a gap formed between the inner circumference of the insert hole and the outer circumference of the inflator by the peripheral area of the through hole. Moreover, since the sealing cloth is sewn to the bag body at at least three portions on generally radial locations about the through hole while provided with the slack relative to the bag body on each hem, even in the event that the direction of action of the tensile force varies during airbag deployment, for example orthogonally, the peripheral area of the through hole is not pulled by the tensile force and the peripheral area covers the gap formed between the inner circumference of the insert hole and the outer circumference of the inflator body. As a consequence, the insert hole of the bag body is prevented from leaking inflation gas which has once flown into the bag body, and thus improving gas seal property in the periphery of the insert hole.

Therefore, the airbag apparatus of the invention has improved gas seal at the insert hole of the airbag for receiving an inflator and prevents gas leak from between the airbag and inflator.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
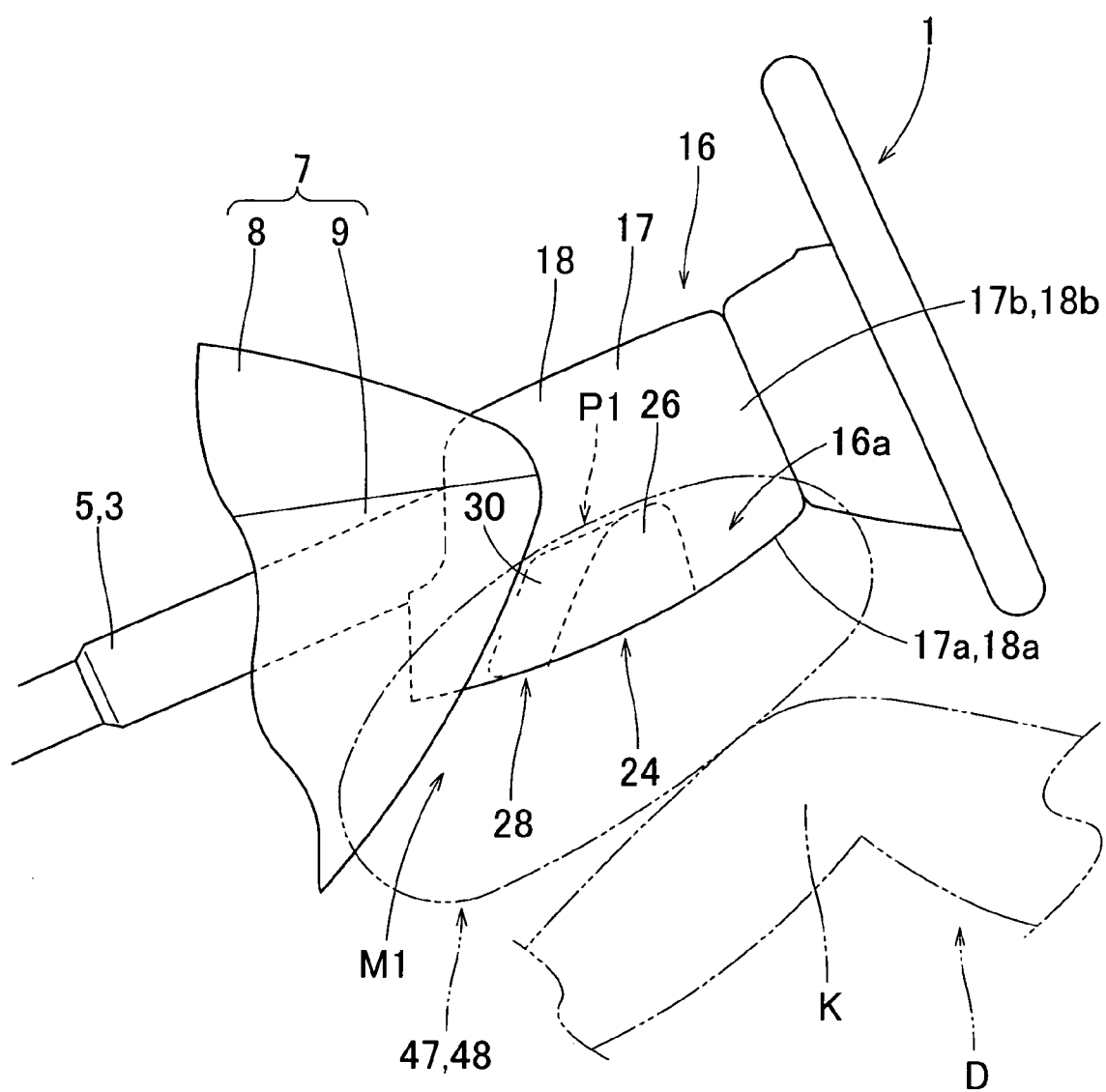
FIG. 1 is a schematic side view of the vicinity of a column cover where a knee-protecting airbag apparatus according to the first embodiment of the invention is mounted.
Figure 2:
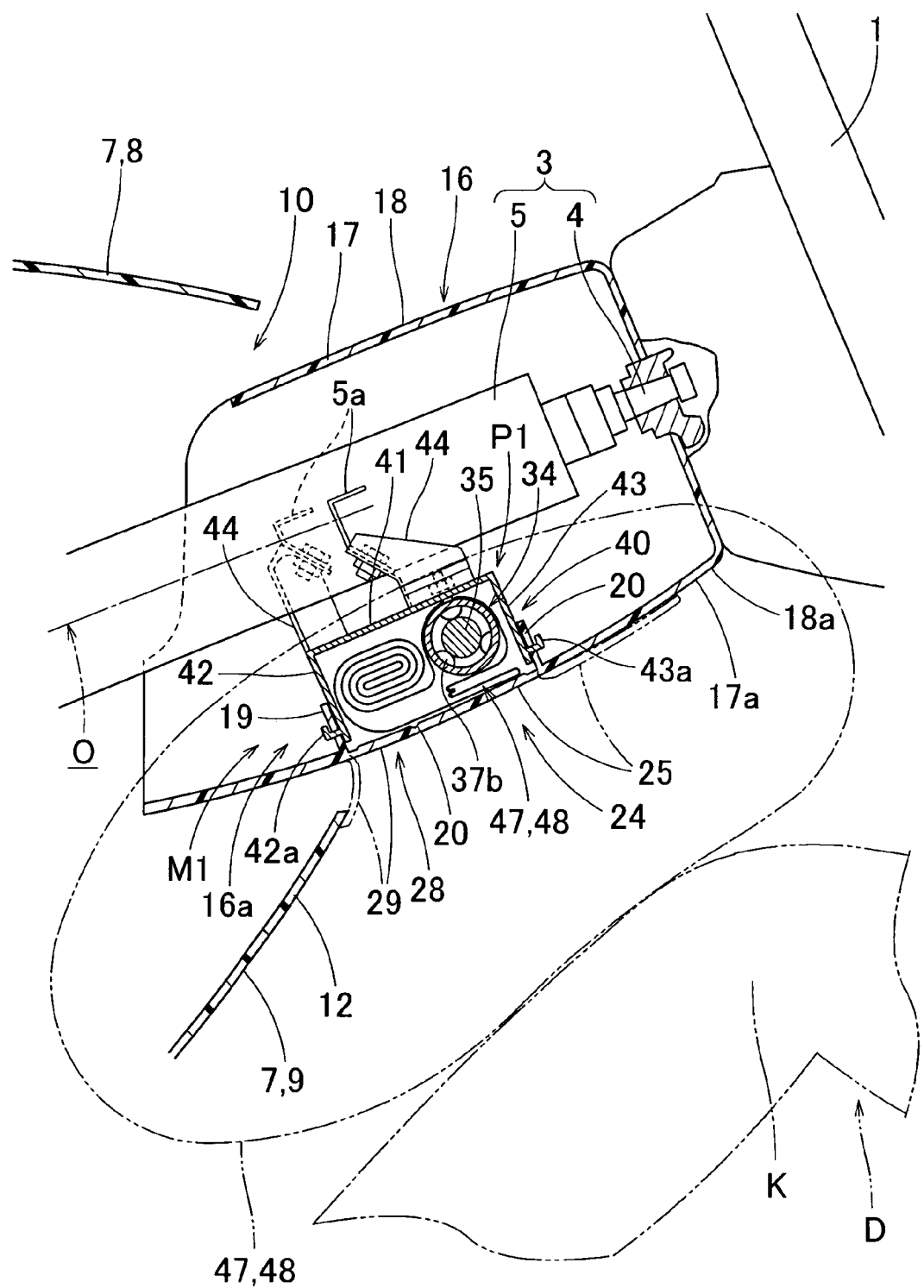
FIG. 2 is a schematic enlarged vertical section of the vicinity of the column cover of FIG. 1 taken along an anteroposterior direction.
Figure 3:
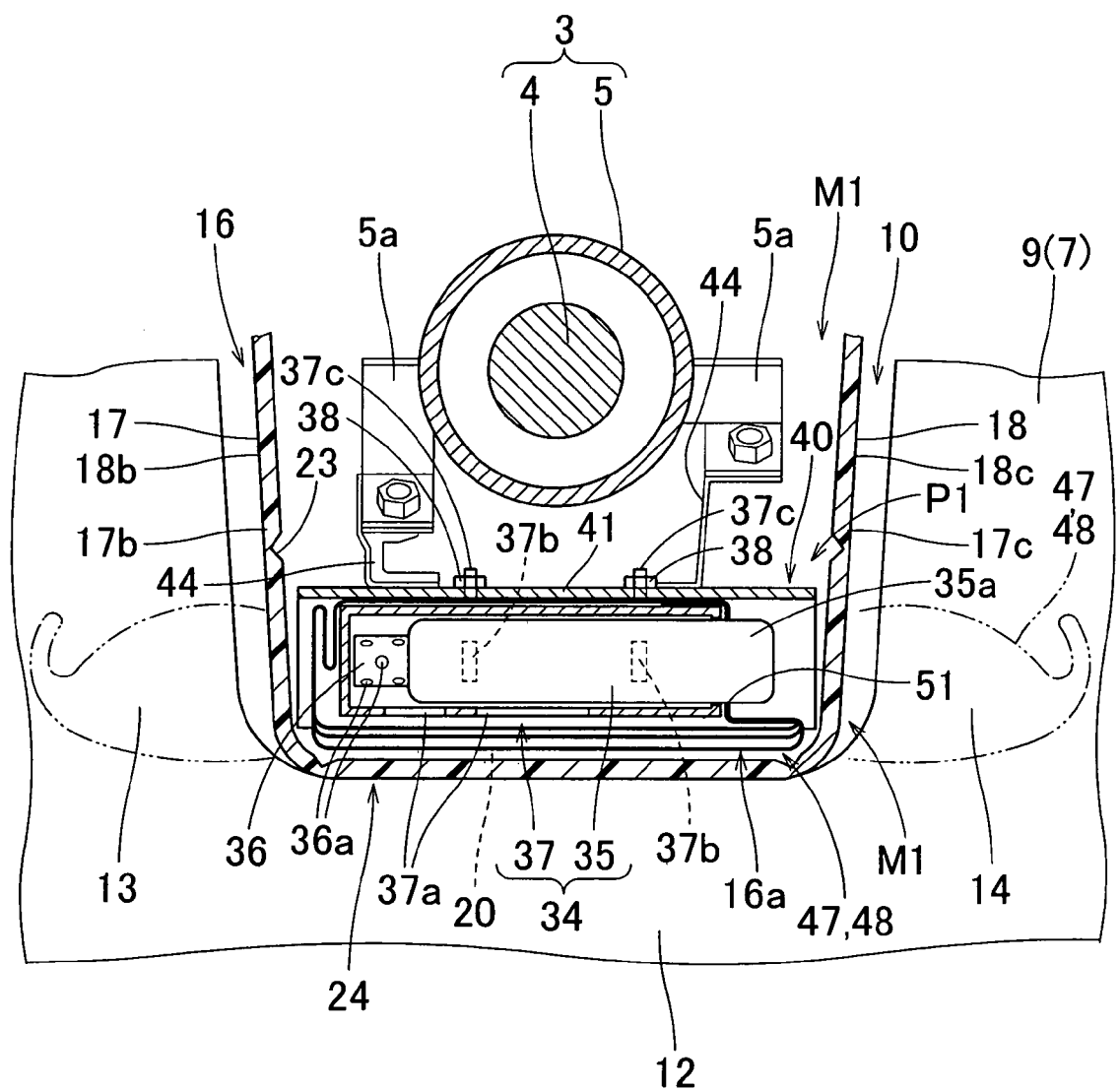
FIG. 3 is a schematic enlarged vertical section of the vicinity of the column cover of FIG. 1 taken along a left and right direction.

As shown in FIGS. 1 and 2, a knee-protecting airbag apparatus M1 according to the first embodiment of the invention is mounted on a steering column 3 and housed in a lower space 16a inside the column cover 16 with the aim of protection of knees K (KR and KL) of a driver D seated in a driver's seat. As shown in FIGS. 2 and 3, the airbag apparatus M1 includes an airbag 47 and an inflator 34 that supplies inflation gas to the airbag 47, and is housed in a housing area P1 located in the lower space 16a of the column cover 16.

Unless otherwise specified, front/rear, up/down and left/right directions referred to in this specification are based on the axial direction O (FIG. 2) of the steering column 3. Front/rear direction is intended to refer to a front/rear direction extending along the axial direction of the steering column 3. Up/down direction is intended to refer to an up/down direction extending perpendicularly to the axial direction, and left/right direction is intended to refer to a left/right direction extending perpendicularly to the axial direction.

Referring to FIGS. 1 to 3, the column cover 16 is fabricated of synthetic resin into a generally square tubular contour that is mounted around the steering column 3 and projects rearward from an instrument panel or dashboard 7. The column cover 16 is attached to a column tube 5 of the steering column 3 at its unillustrated region and is located in front of a seated driver D in such a manner as to protrude diagonally rearward from an installation opening 10 formed on the dashboard 7 for installing the column cover 16, along the axial direction O (FIG. 2) of the steering column 3 with its front end located downward and its rear end upward. The steering column 3 includes a main shaft 4 and the column tube 5 mounted around the main shaft 4, and a steering wheel 1 is connected to the rear end of the main shaft 4. The dashboard 7 is comprised of an upper panel 8 constituting the upper part and a lower panel 9 constituting the lower part.

Figure 8:
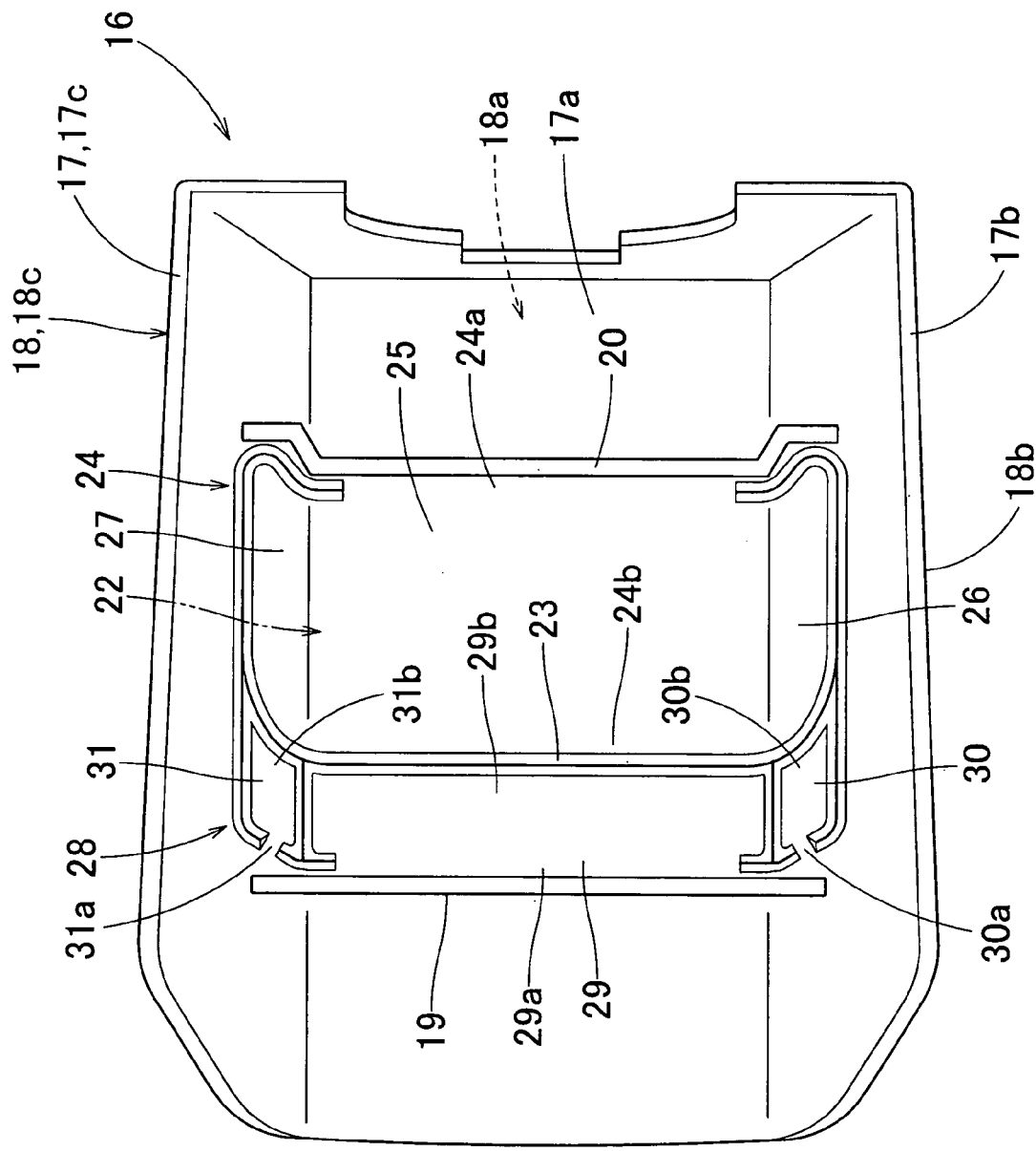
FIG. 8 is a plan view of a lower part of the column cover of FIG. 1.
Figure 9A:
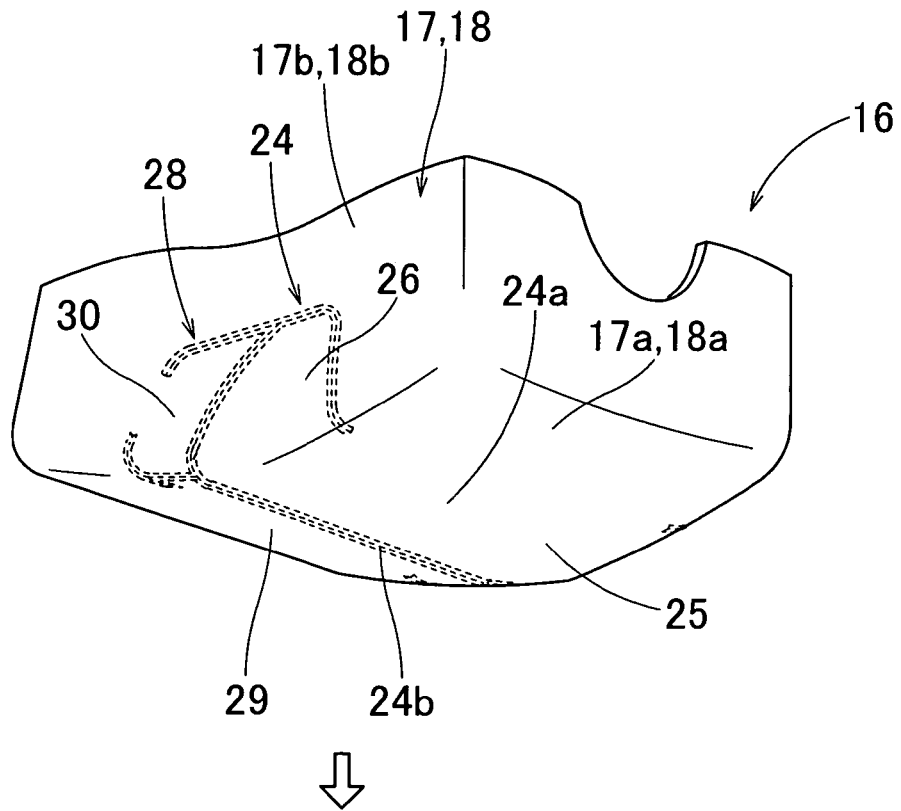
FIG. 9A is a perspective view of the part of the column cover of FIG. 8 showing the way the door is closed.
Figure 9B:
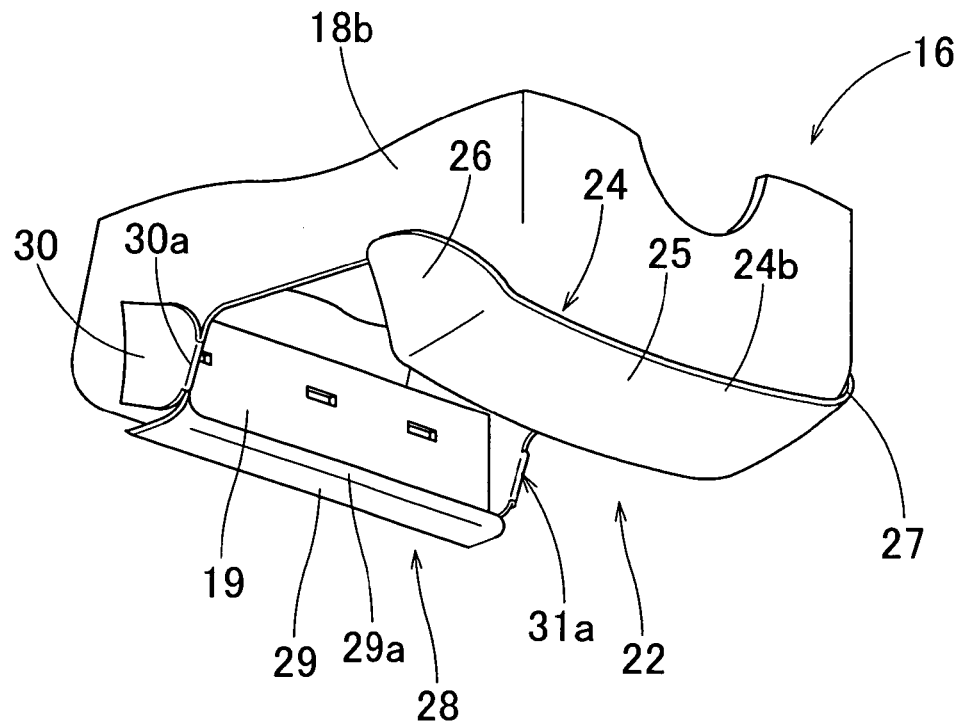
FIG. 9B is a perspective view of the part of the column cover of FIG. 8 showing the way the door is open.

As shown in FIGS. 2, 3, 8 and 9, the column cover 16 includes, in an area of its outer surface 18 ranging from the lower side 18a to the left side 18b and right side 18c, a door 24 adapted to open when pushed by the airbag 47 and providing an airbag emergence opening 22 allowing the airbag 47 to emerge therefrom. The door 24 is disposed at the rear relative to the rear side or underside 12, 13 and 14 (FIGS. 2 and 3) of the dashboard 7, and includes a lower section 25 located on the lower side 18a, a left section 26 located on the left side 18b, and a right section 27 located on the right side 18c, respectively of the column cover 16, and around the door 24 is a tearable portion 23 to be torn when pushed by the airbag 47. The tearable portion 23 is composed of a continuous linear groove formed on an inner surface of the circumferential wall 17 of the column cover 16 so as to thin the thickness of the column cover 16 (FIG. 8). The door 24 opens around a hinge portion 24a located at the rear edge of the lower section 25, which is an integral hinge, such that the front edge 24b of the door 24 rotates rearward. At this time, as shown in FIG. 9B, the left section 26 and right section 27 open rearward along with the lower section 25 with their respective lower edges connected with the left and right edges of the lower section 25, and then are reversed and contact with the left side 18b and right side 18c of the column cover 16.

As shown in FIGS. 1, 2, 8 and 9, the column cover 16 of this specific embodiment further includes an auxiliary door 28 that is adapted to open together with the door 24 when pushed by the airbag 47 in order to enlarge the emergence opening 22. The auxiliary door 28 includes a lower door section 29 disposed on the lower side 18a, a left door section 30 on the left side 18b and a right door section 31 on the right side 18c, respectively of the column cover 16, and around each of them is a tearable portion 23. The lower door section 29, left door section 30, and right door section 31 of the auxiliary door 28 are designed to open around hinge portions 29a, 30a and 31a disposed at respective front edges such that respective rear edges 29b, 30b and 31b rotate forward (FIGS. 8, 9A and 9B). The hinge portions 29a, 30a and 31a are integral hinges.

As shown in FIGS. 2 and 8, the column cover 16 internally includes along the front edge of the auxiliary door 28 and along the rear edge of the door 24 end walls 19 and 20. Each of the end walls 19 and 20 extends upward from the bottom wall 17a of the circumferential wall 17 with left and right edges connected with the left wall 17b and right wall 17c of the circumferential wall 17. The end walls 19 and 20 serve to define the housing area P1 accommodating the airbag 47 as folded up together with a later-described case 40. The end walls 19 and 20 also act as mounting walls on which the case 40 is mounted. Specifically, each of the side walls 19 and 20 includes a plurality of slots (reference numeral omitted) for receiving and holding later-described retaining lugs 42a and 43a of the case 40.

The housing area P1 housing the airbag 47 and the inflator 34 is defined by the left section 26 and right section 27 of the door 24, the left door section 30 and right door section 31 of the auxiliary door 28, on the lateral, by later-described end walls 42 and 43 of the case 40, at the front and rear, by likewise a later-described ceiling wall 41 of the case 40 on the top side, and by the lower section 25 of the door 24 and lower door section 29 of the auxiliary door 28 at the bottom.

As shown in FIG. 3, the inflator 34 includes a generally columnar body 35 and a generally columnar head 36 located at the leading end of the inflator 34 and smaller than the body 35 in diameter. The head 36 is provided with gas discharge ports 36a. In the illustrated embodiment, the disposition of the inflator 34 as coupled to the case 40 or housing area P1 and mounted on the vehicle is such that the axial direction of the inflator body 35 extends along a left and right direction, perpendicularly to the axial direction O of the steering column 3. The root end 35a (or right end, in the illustrated embodiment) is located on an inner circumference 51a of a later-described insert hole 51 of the bag body 48 and on an inner circumference 59a of a later-described through hole 59 of a sealing cloth 58, and projects out of the insert hole 51 of the bag body 48. A connector to which a lead wire extending from an activating circuit is connected to is to be coupled to the root end 35a although unillustrated.

A diffuser 37 having a tubular contour is mounted around the inflator 34 almost all over except the root end region 35a remote from the head 36. The diffuser 37 is located inside the bag body 48 and includes on the underside a plurality of outlet ports 37a for releasing inflation gas into the airbag 47 (airbag body 48). The diffuser 37 holds the inflator body 35 with a plurality of holding portions 37b. The holding portions 37b are formed radially about the axial center of the inflator body 35 and along the axial direction of the diffuser 37. Each of the holding portions 37b projects inward, toward the inflator body 35, as shown in FIG. 2. The diffuser 37 further includes two bolts 37c for securing the inflator 34 to the case 40. The bolts 37c are located at two positions on a left and right direction of the diffuser 37 (or on the axial direction of the inflator body 35) and project upward, perpendicularly to the axial direction of the inflator body 35. In this specific embodiment, the case 40 has through holes 41a for receiving the bolts 37c on the ceiling wall 41, and the airbag 47 and inflator 34 are attached to the case 40 by the bolts 37c of the diffuser 37 projected out of later-described mounting holes 53 of the airbag 40, inserted into the through holes 41a of the case 40 and fastened with nuts 38 (FIGS. 3 and 11).

The case 40 is made of sheet metal and has a generally inverted U-shaped section as shown in FIG. 2. The case 40 includes a ceiling wall 41 and end walls 42 and 43 extending downward from front and rear edges of the ceiling wall 41. Each of the end walls 42 and 43 is provided with a plurality of retaining lugs 42a/43a each having a generally J-shaped section. The retaining lugs 42a and 43a are put into the above-described slots of the end walls 19 and 20 of the column cover 16 for joint with the end walls 19 and 20. The ceiling wall 41 is provided with a plurality of through holes 41a (FIG. 11) for receiving the bolts 37c of the inflator 34. The case 40 is further provided on the ceiling wall 41 with mounting brackets 44 that attach the case 40 to the column tube 5. In this specific embodiment, the mounting brackets 44 are bolt fixed to brackets 5a extending from the column tube 5 and thus the case 40 is secured to the vehicle body structure (FIGS. 2 and 3).

Figure 4:
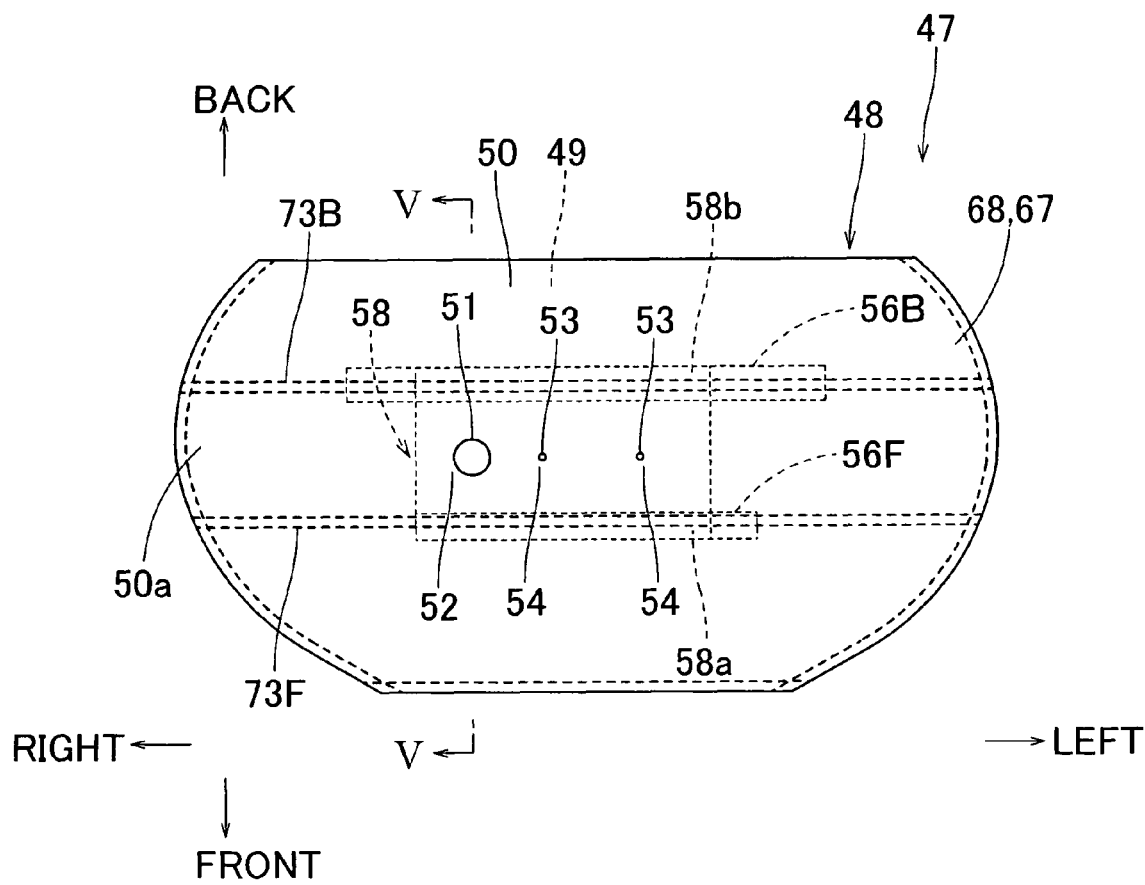
FIG. 4 is a plan view of an airbag used for the airbag apparatus of the first embodiment.
Figure 5:
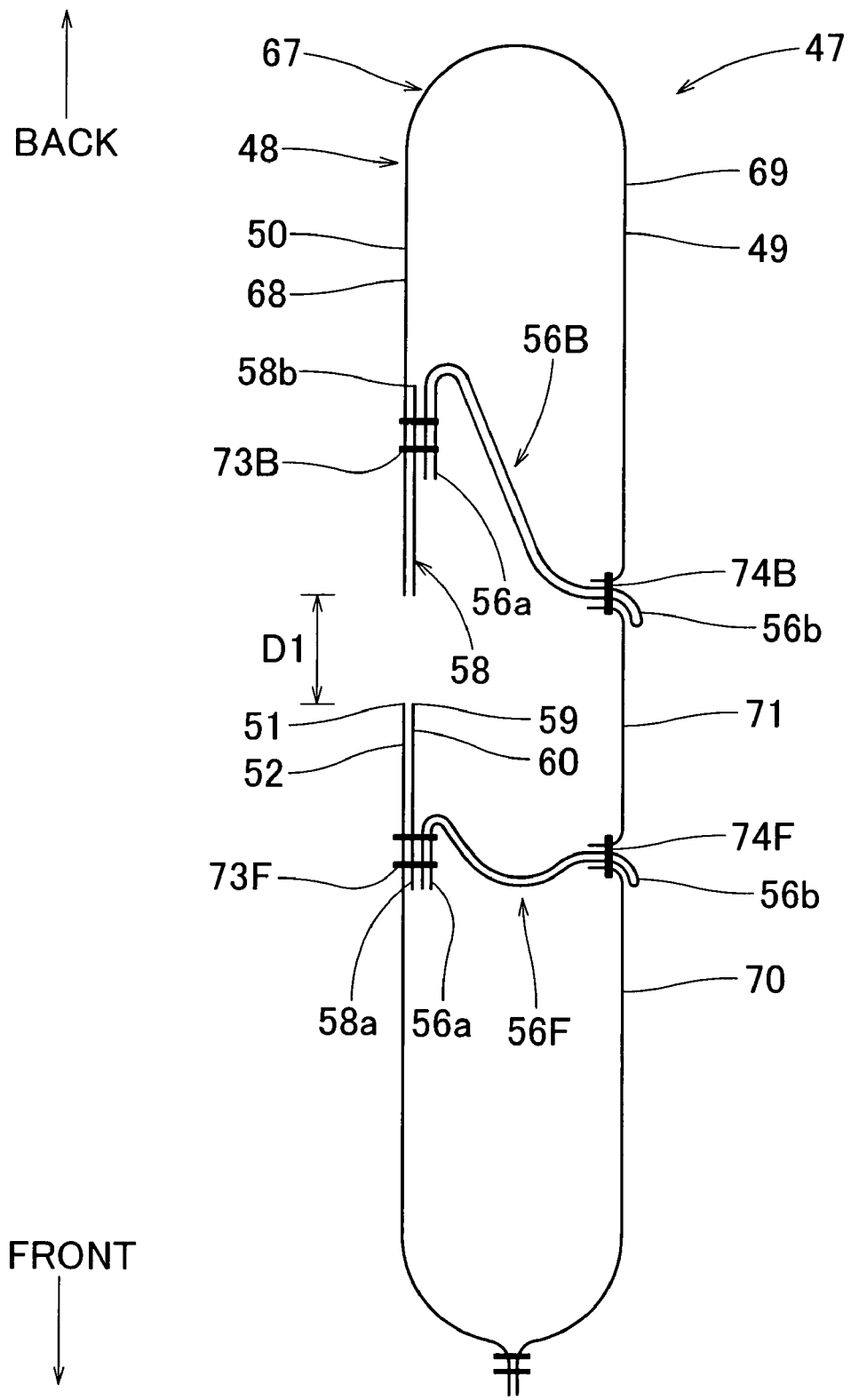
FIG. 5 is a vertical section of the airbag of FIG. 4 taken along line V-V of FIG. 4.

The airbag 47 is designed to emerge from the emergence opening 22 formed by opening of the door 24 of the column cover 16 and deploy generally in an anteroposterior direction along the underside 18a of the column cover 16. Referring to FIGS. 4 and 5, the airbag 47 includes a bag body 48, a sealing cloth 58 and two tethers 56F and 56B located inside the bag body 48.

Figure 10:
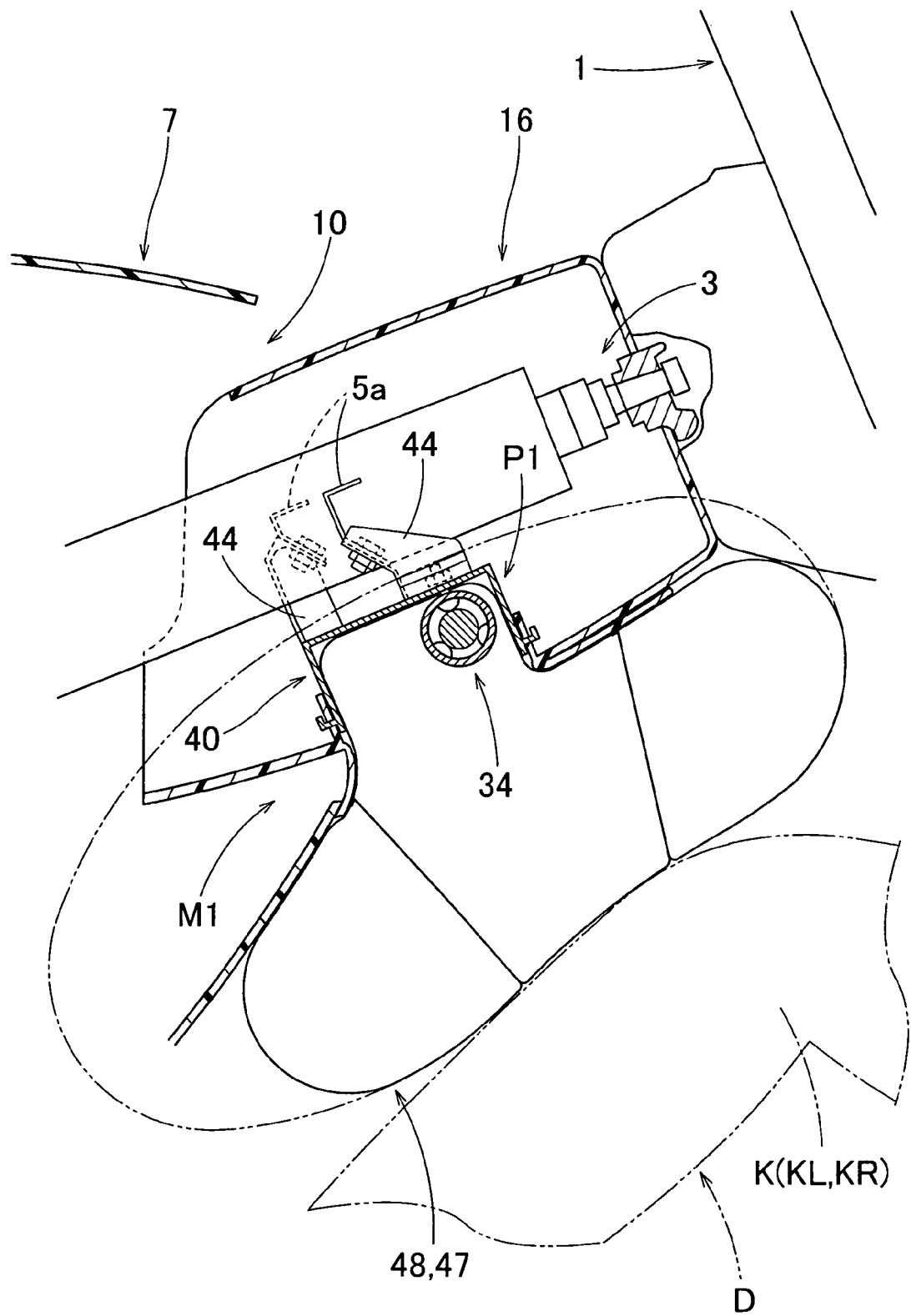
FIG. 10 is a schematic section of the airbag apparatus of the first embodiment at full inflation of the airbag, taken along an anteroposterior direction.

The bag body 48 constitutes an outer circumferential wall of the airbag 47, and is formed into a generally rectangular plate shape elongative in a left and right direction so it is capable of protecting both knees K (KL and KR) of a driver or occupant D. More specifically, as shown in FIG. 4, the bag body 48 at full inflation is a generally trapezoid becoming broader toward the rear edge and covers the underside 18a of the column cover 16 and rear sides 12, 13 and 14 of the dashboard 7 extending below and at the left and right of the column cover 16 so it is located in front of knees K (KR and KL) of the driver D (FIGS. 2 and 10). The bag body 48 includes an occupant side panel 49 deployable toward the driver D and a column side panel 50 deployable toward the column cover 16 or vehicle body structure, i.e., above the occupant side panel 49. In this specific embodiment, the occupant side panel 49 and column side panel 50 are identical in outer contour and are coupled or sewn together by outer circumferential edges to form the bag body 48. As shown in FIG. 4, the column side panel 50 includes generally at the center in a vertical direction and slightly to the right relative to the center in a left and right direction of the airbag 47 (bag body 48) an insert hole 51 for receiving the inflator 34. The insert hole 51 is round in shape and so sized to accommodate the root end region 35a of the inflator body 35 without a gap. On the left of the insert hole 51 are two mounting holes 53 for receiving the bolts 37c of the diffuser 37. The mounting holes 53 line up in a left and right direction.

An area around the mounting holes 53 on the column side panel 50 of the bag body 48 acts as a mounting area 54 at which area the airbag 47 is mounted on the case 40 or housing area P1. Specifically, when the bolts 37c of the diffuser 37 are nut fastened to the ceiling wall 41 of the case 40, the mounting area 54 is clamped between the diffuser 37 and ceiling wall 41, and thus mounting the airbag 47 to the case 40 (FIGS. 11A and 11B).

Figure 11A:
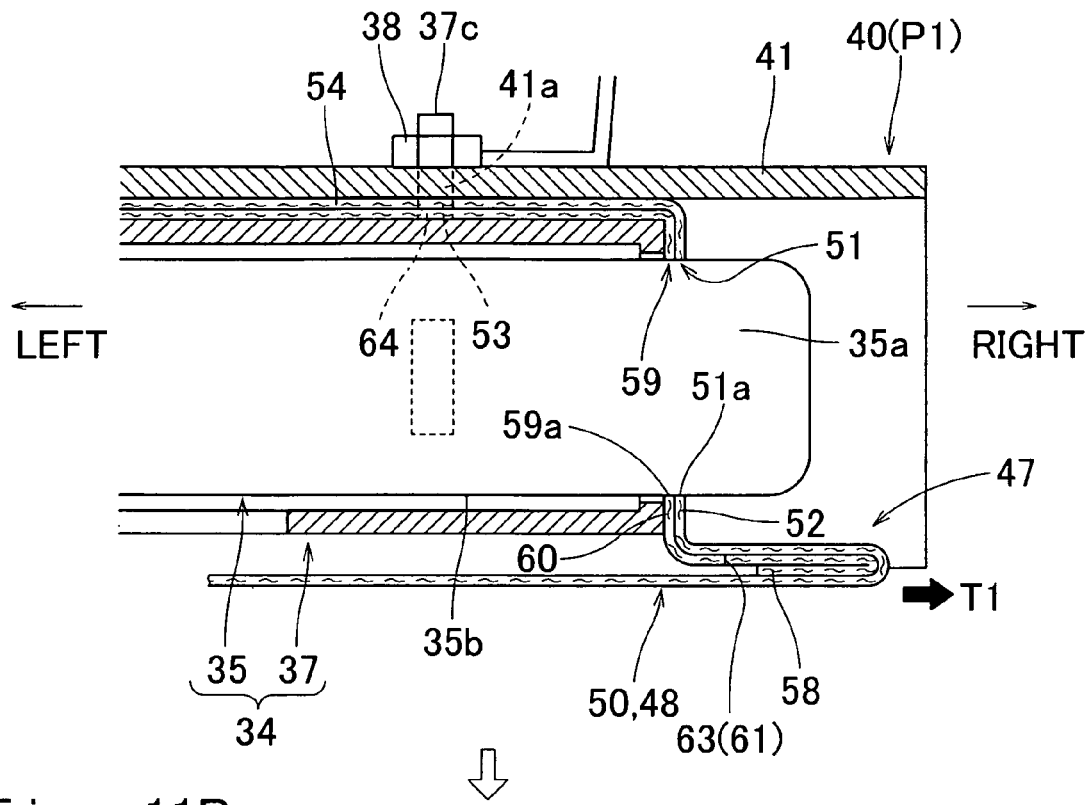
FIGS. 11A and 11B are partial enlarged sections illustrating the behavior of the sealing cloth of FIG. 7 at operation of the airbag apparatus.
Figure 11B:
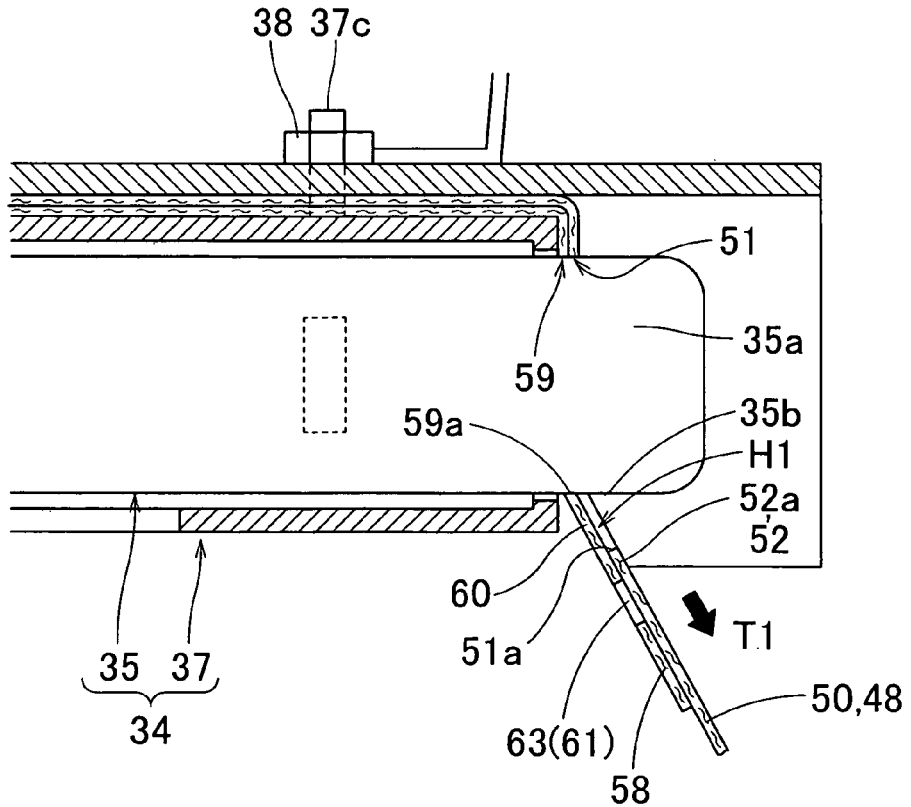

As shown in FIGS. 3, 11A and 11B, the airbag 47 (bag body 48) is mounted on the housing area P1 at the left region of the insert hole 51. That is, the insert hole 51 is located on the right of the mounting holes 53, in other words located between the mounting holes 53 (mounting area 54) and the right edge 50a of the column side panel 50 as shown in FIG. 4. With this configuration, when the column side panel 50 unfurls in four directions (i.e. toward the front, rear, left and right) upon airbag deployment, the peripheral area 52 of the insert hole 51 is subjected to a tensile force T1 that pulls the peripheral area 52 forward, backward and to the right, especially forcefully to the right. Especially in this specific embodiment, later-described seams 73F and 73B that sew tethers 56F and 56B to the column side panel 50 are located in front and at the rear of the insert hole 51, and therefore, the peripheral area 52 of the insert hole 51 is hard to stretch to the front or rear, but the tensile force T1 acts to pull the right periphery 52a of the peripheral area 52 of the insert hole 51 forcefully to the right as shown in FIGS. 11A and 11B.

As shown in FIGS. 4 and 5, the tethers 56F and 56B connect the occupant side panel 49 and column side panel 50 inside the bag body 48 so the airbag 47 at full inflation is controlled in shape by the tethers 56F and 56B. In the illustrated embodiment, each of the tethers 56F and 56B has a band shape extending along a left and right direction. The tethers 56F and 56B are respectively located in front and at the rear of the insert hole 51 and mounting holes 53, in other words in front and at the rear of the mounting area 54 to the case 40. Each of the tethers 56F and 56B is sewn to the occupant side panel 49 and column side panel 50 at opposite edges in a width direction by seams 73F and 74F/73B and 74B, and thus connecting the panels 49 and 50. As shown in FIG. 5, in order to spare a space for accommodating the inflator 34 between the tethers 56F and 56B, the seam 73B that joins the rear tether 56B, which is located at the rear of the insert hole 51, to the column side panel 50 is located to the rear relative to the seam 74B for connection to the occupant side panel 49.

Figure 6:
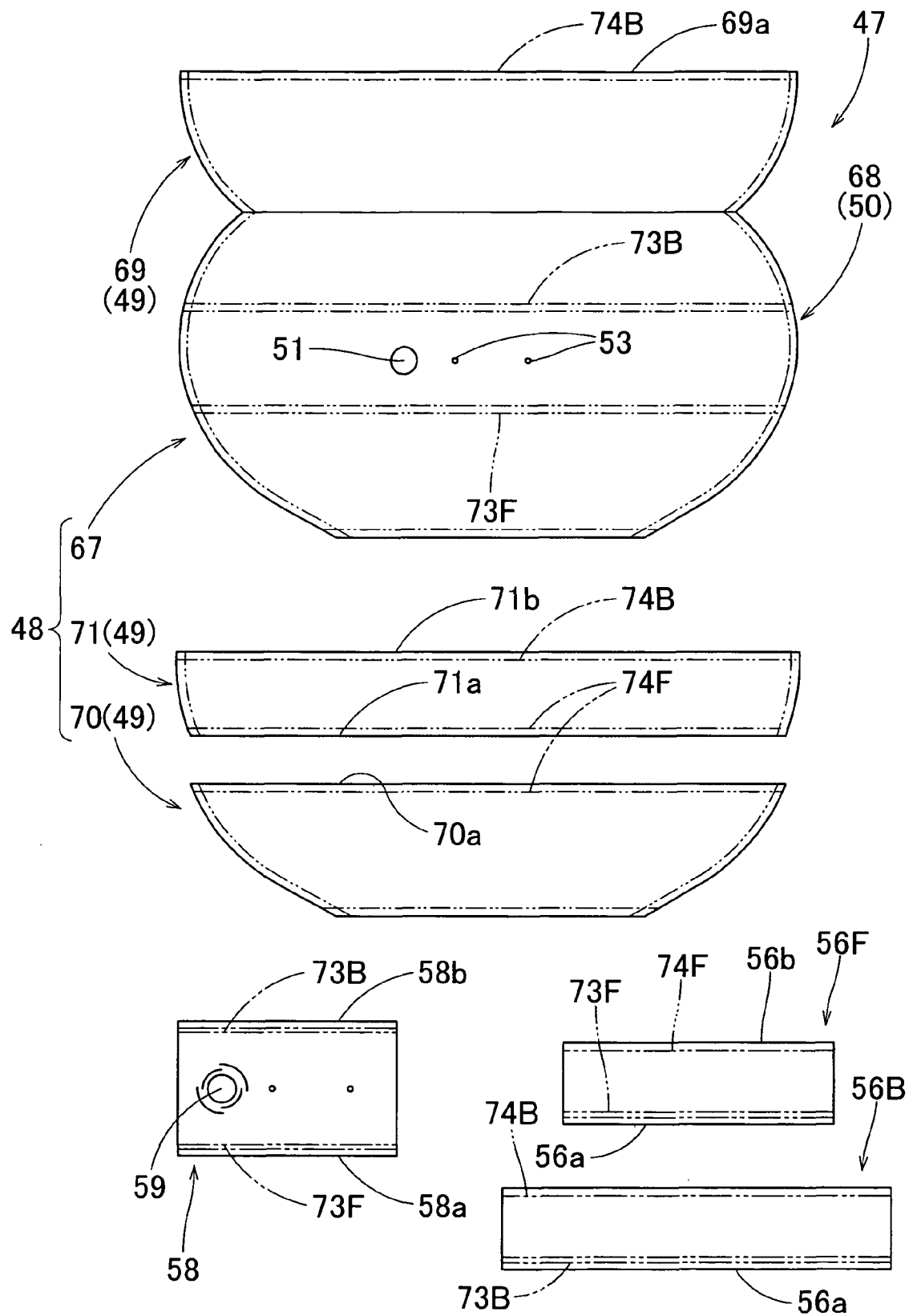
FIG. 6 illustrates base cloths of the airbag of FIG. 4 by plan views.

The bag body 48 is formed by sewing or coupling predetermined-shaped base cloths together. In this specific embodiment, as shown in FIGS. 5 and 6, the bag body 48 is comprised of a column side cloth 67 that constitutes the column side panel 50, a front occupant side cloth 70 that constitutes a front ⅓ region of the occupant side panel 49 and a middle occupant side cloth 71 that forms a central region of the occupant side panel 49. The column side cloth 67 is so shaped that a column side region 68 that constitutes the column side panel 50 and a rear lower region 69 that forms a rear region of the occupant side panel 49 are connected in series. The front occupant side cloth 70 and middle occupant side panel 71 are respectively formed into a band-shape extending in a left and right direction. The cloths 67, 70, 71 and tethers 56F and 56B in this embodiment are made of a woven fabric of polyester, polyamide or the like.

Figure 7:
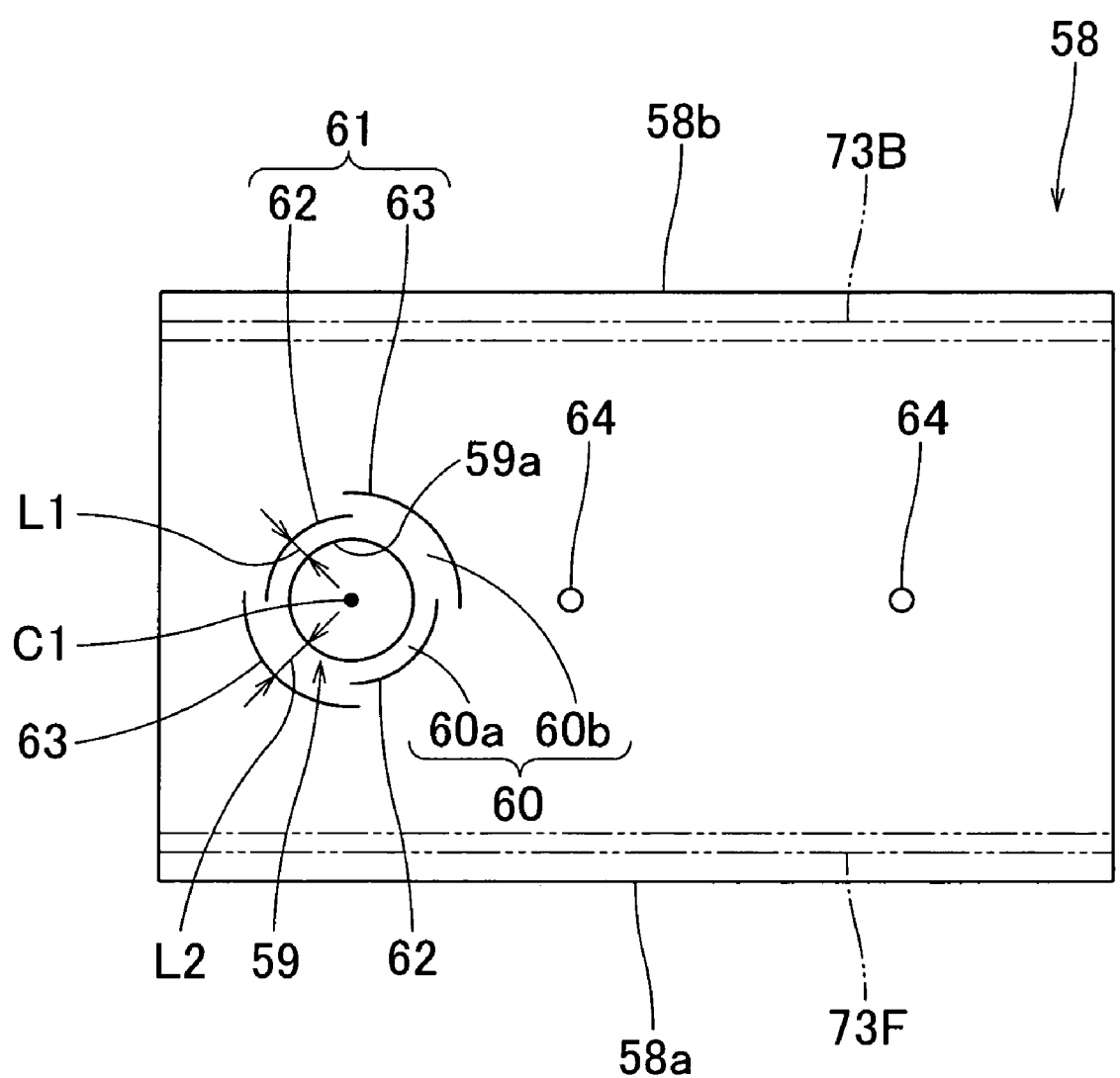
FIG. 7 is a plan view of a sealing cloth as is flattened.

The sealing cloth 58 is made of a flexible woven fabric of polyester, polyamide or the like alike the bag body 48. It has a rectangular plate shape and is arranged to cover the vicinity of the insert hole 51 as shown in FIGS. 4 and 5. The sealing cloth 58 is smaller in dimension in a left and right direction than the tether 56F and arranged to extend over the insert hole 51 and mounting holes 53. The cloth 58 is sewn to the column side panel 50 at front and rear edges 58a and 58b by the seams 73F and 73B that joins the tethers 56F and 56B to the panel 50 as well. That is, the front edge 58a and rear edge 58b of the cloth 58 are sewn to the column side panel 50 generally over the entire widths in a left and right direction. As shown in FIG. 7, the cloth 58 includes at locations corresponding to the insert hole 51 and mounting holes 53 a through hole 59 for receiving the inflator body 35 and apertures 64 for receiving the bolts 37c of the inflator 34. The sealing cloth 58 also acts to reinforce the surrounding of the mounting holes 53, i.e., the mounting area 54 of the bag body 48. The inner diameter of the through hole 59 is identical to that of the insert hole 51 of the bag body 48.

Referring to FIG. 7, the sealing cloth 58 includes around the through hole 59 slits 61 each of which is curved in an arcuate manner. In the illustrated embodiment, four slits 61 are arranged to encircle the through hole 59 entirely. Each of the slits 61 is formed into a generally quarter arch. More specifically, the slits 61 include two inner slits 62 arranged symmetrically about the center C1 of the through hole 59 and two outer slits 63 also arranged symmetrically about the center C1 of the through hole 59 outside of the inner slits 62. Each of the slits 62 is a quarter arch formed about the center C1. The outer slits 63 are located at regions where there are no inner slits 62 and outside the inner slits 62, and each of the slits 63 is also a quarter arch formed about the center C1 of the through hole 59. Opposite ends of each of the outer slits 63 so extend as to lap over outer circumferences of the inner slits 62. That is, the outer slits 63 and inner slits 62 are in such an arrangement as to overlap one another at opposite ends in an in and out direction. Thus the slits 61, i.e. the inner slits 62 and outer slits 63, are so formed as to encircle the through hole 59 wholly in a circumferential direction, with no space between.

Figure 12A:
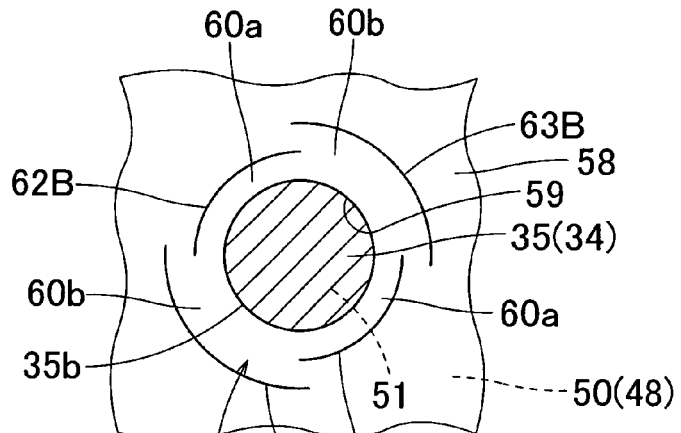
FIGS. 12A, 12B and 12C are schematic diagrams illustrating the behavior of the sealing cloth of FIG. 7 at operation of the airbag apparatus.

The peripheral area 60 of the through hole 59, which is an area enclosed by the outer slits 63, inner slits 62 and through hole 59, is so sized as to cover up a gap H1 (FIGS. 11B and 12) which would arise between the inner circumference 51a of the insert hole 51 and an outer circumference 35b of the inflator body 35 when a tensile force T1 acts on the peripheral area 52 of the insert hole 51 of the bag body 48. More specifically, the inner diameter D1 (FIG. 5) of the insert hole 51 (which equals to that of the through hole 59) is 25 mm, which generally equals to the outer diameter of the inflator body 35. The gap H1 arisable between the inner circumference 51a of the insert hole 51 and outer circumference 35b of the inflator body 35 is estimated to have a width of up to 5 mm. Thus the distance L1 (FIG. 7) between each of the inner slits 62 and the through hole 59, i.e. the width of a narrow region 60a of the peripheral area 60, is set at 10 mm. The distance between an inner slit 62 and outer slit 63 is generally identical to that between the through hole 59 and inner slit 62, and therefore, the distance L2 between each of the outer slits 63 and the through hole 59, i.e. the width of a wide region 60b of the peripheral are 60, is set at 20 mm.

Mounting of the knee-protecting airbag apparatus M1 on a vehicle is now described. Firstly, the airbag 47 is manufactured as follows: The sealing cloth 58 is preliminarily provided with the through hole 59, slits 61 and apertures 64 whereas the column side cloth 67 is provided with the insert hole 51 and mounting holes 53. The front occupant side cloth 70 and middle occupant side panel 71 are so overlapped as to align the rear edge 70a and front edge 71a, with the tether 56F tucked there between, and then sewn together by the rear edge 70a and front edge 71a together with the lower edge 56b of the tether 56F, and thus forming the seam 74F. Subsequently, the middle occupant side cloth 71 and the rear lower region 69 of the column side cloth 67 are so overlapped as to align the rear edge 71b and front edge 69a, with the tether 56B tucked there between, and then sewn together by the rear edge 71b and front edge 69a together with the lower edge 56b of the tether 56B, thus forming the seam 74B as well as completing the occupant side panel 49. Then the sealing cloth 58 is applied to the inner surface of the column side cloth 67, and the tether 56B is so arranged on the column side region 68 of the column side cloth 67 that the upper edge 56a overlaps with the rear edge 58b of the sealing cloth 58. Then the upper edge 56a of the tether 56B and the rear edge 58b of the sealing cloth 58 are sewn to the column side region 68, thus providing the seam 73B. Similarly, the upper edge 56a of the tether 56F and the front edge 58a of the sealing cloth 58 are sewn together to the column side region 68 and providing the seam 73F. Thus the sealing cloth 58 is sewn to the column side panel 50. Thereafter, the occupant side panel 49 and column side panel 50 are sewn together by outer peripheral edges and thereby completing the airbag 47 (bag body 48).

Subsequently, the airbag 47 thus produced is folded up. Specifically, the airbag 47 is folded up in such a condition that the inflator 34 is housed inside so that the root end region 35a of the inflator body 35 protrudes from the insert hole 51 or through hole 59. At this time, the bolts 37c of the inflator 34 are projecting out of the mounting holes 53 via the apertures 64 of the sealing cloth 58. The inset of the inflator 34 is conducted during the sewing of the outer peripheral edge of the airbag 47. The sewing is so conducted as to leave part of the outer peripheral edge unsewn so that the unsewn part serves as an inset hole to put the inflator 34 into the bag body 48. After the inflator 34 is inset from the inset hole, the hole is sewn up and closed. In this state, the airbag 47 is folded up and reduced in dimensions in a front and rear and left and right directions. The airbag 47 as folded up is wrapped up by an unillustrated wrapping member for keeping the folded-up configuration. At this time, the bolts 37c and the root end region 35a of the inflator 34 are taken out of the wrapping member. Subsequently, the airbag 47 is housed inside the case 40 together with the inflator 34 such that the bolts 37c project out of the ceiling wall 41. Then fastening the nuts 38 with the bolts 37c completes the mounting of the inflator 34 and airbag 47 on the case 40 and provides an airbag module.

Thereafter, the mounting brackets 44 provided on the ceiling wall 41 of the case 40 are bolt fastened to the brackets 5a of the column tube 5, and thus mounting the airbag module to the vehicle body structure. If a lead wire of the activation circuit is connected to the root end region 35a of the inflator body 35 and the column cover 16 is mounted on the steering column 3, the knee-protecting airbag apparatus M1 is mounted on the vehicle.

When the inflator body 35 on board is fed with an activating signal via the lead wire, the body 35 emits inflation gas from the discharge ports 36a on the head 36, and the gas flows into the airbag 47 (bag body 48) via the outlet ports 37a of the diffuser 37. Then the bag body 48 pushes and opens the door 24 and auxiliary door 28 of the column cover 16 to form the emergence opening 22, and projects downward there from for deployment as indicated by double dashed lines in FIGS. 1, 2 and 10.

In the airbag apparatus M1 of the first embodiment of the invention, when the inflator body 35 inserted into the airbag 47 emits inflation gas from the discharge ports 36a on the leading end region, the airbag 47 emerges from the housing area P1 for deployment. At this time, since the peripheral area 52 of the insert hole 51 on the bag body 48 is positioned by the diffuser 37 secured to the case 40 (housing area P1), the tensile force T1 exerted towards the deployment direction of the airbag 47 from the mounting area 54 (mounting holes 53) of the bag body 48, in other words towards the right from the insert hole 51, acts to pull the right region 52a of the peripheral area 52 of the insert hole 51 toward the right, so that a gap H1 is formed between a portion of the inner circumference 51a of the insert hole 51 on the action direction of the tensile force T1, i.e. the right portion of the inner circumference 51a, and the outer circumference 35b of the inflator 34 as shown in FIG. 11B.

However, the airbag 47 of the airbag apparatus M1 includes the sealing cloth 58 arranged to cover the peripheral area 52 of the insert hole 51 on the inner circumference of the bag body 48, and the sealing cloth 58 includes around the through hole 59 for receiving the inflator 34 a plurality of slits 61 (the inner slits 62 and outer slits 63) each of which is curved in an arcuate fashion such that the slits 61 encircle the through hole 59 generally wholly in a circumferential direction of the through hole 59 in combination. With this configuration, even in the event that the tension force T1 acts on the peripheral area 52 of the insert hole 51 toward the deployment direction of the airbag 47 from the mounting area 54, the sealing cloth 58 is pulled due to the tensile force T1 in such a manner as to allow some of the slits 61 to open as shown in FIG. 11B, and thus the peripheral area 60 of the through hole 59 of the sealing cloth 58 located between the slit 61 and the through hole 59 is not pulled by the tensile force T1 and stays in close contact with the outer circumference 35b of the inflator 34. That is, the peripheral area 60 is enabled to slip relative to the peripheral area 52 of the insert hole 51 of the bag body 48. As a result, the sealing cloth 58 covers the gap H1 formed between the inner circumference 51a of the insert hole 51 and the outer circumference 35b of the inflator 34 by the peripheral area 60 of the through hole 59 as shown in FIG. 11B.

Moreover, since the slits 61 (the inner slits 62 and outer slits 63) are formed to encircle the through hole 59 generally wholly in a circumferential direction, even in the event that the direction of action of the tensile force T1 varies during airbag deployment, for example changes toward a direction generally orthogonal to the deployment direction of the airbag 47, the peripheral area 60 of the through hole 59 is not pulled by the tensile force T1 and the peripheral area 60 covers the gap H1 formed between the inner circumference 51a of the insert hole 51 and the outer circumference 35b of the inflator 34.

Figure 12B:
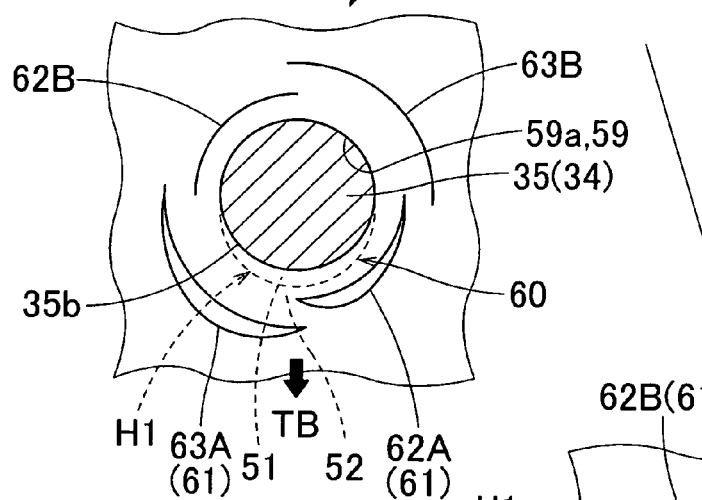
Figure 12C:
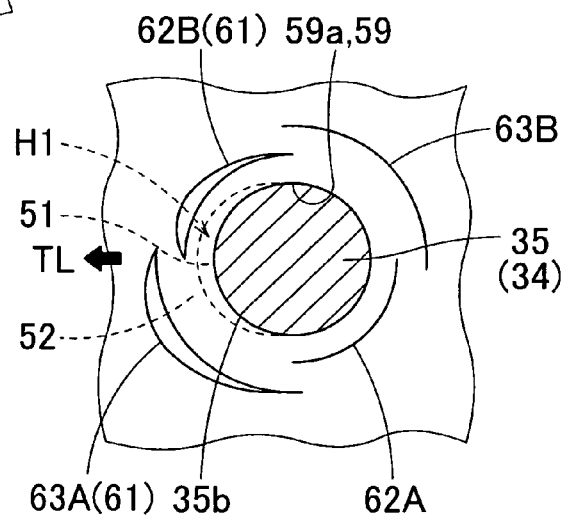

More specifically, assuming an instance in which a tensile force TB acts on the column side panel 50 downward as shown in FIG. 12B, the tensile force TB pulls the region of the sealing cloth 58 below the slits 61 downward, but due to opening of the inner slit 62A located on the lower right of the through hole 59 and the outer slit 63A located on the lower left of the through hole 59, the peripheral area 60 located above the inner slit 62A and outer slit 63A is not affected by the tensile force TB and does not move downward. Thus the inner circumference 59a of the through hole 59 and the outer circumference 35b of the inflator 34 are kept in contact with each other and the gap H1 formed below the inflator 34 is closed off by the peripheral area 60 located above the inner slit 62A and outer slit 63A. Assuming now an instance where a tensile force TL acts on the column side panel 50 toward the left as shown in FIG. 12C, the tensile force TL pulls the region of the sealing cloth 58 on the left of the slits 61 to the left, but due to opening of the inner slit 62B located on the upper left of the through hole 59 and the outer slit 63A located on the lower left of the through hole 59, the peripheral area 60 located on the right of the inner slit 62B and outer slit 63A is not affected by the tensile force TL and does not move to the left. Thus the inner circumference 59a of the through hole 59 and the outer circumference 35b of the inflator 34 are kept in contact with each other and the gap H1 formed on the left of the inflator 34 is closed off by the peripheral area 60 located on the right of the inner slit 62B and outer slit 63A.

In other words, in the airbag apparatus M1 of the first embodiment, although sewn to the column side panel 50 by entire widths of the front edge 58a and rear edge 58b, the sealing cloth 58 keeps contact with the outer circumference 35b of the inflator body 35 at the inner circumference 59a of the through hole 59 without being affected by the column side panel 50 movable due to the tensile force T1. As a consequence, the insert hole 51 of the bag body 48 is prevented from leaking inflation gas which has once flown into the bag body 48, and therefore improving gas seal property in the periphery of the insert hole 51.

Therefore, in the knee-protecting airbag apparatus M1 according to the first embodiment of the invention, the airbag 47 has an enhanced gas seal at the peripheral area 52 of the insert hole 51 which would be easily affected by a tensile force and cause a gap between the airbag 47 and inflator 34, and is capable of preventing gas leak from such a gap as much as possible.

The number of the slits 61 formed on the sealing cloth 58 should not be limited to four irrespective of the description of the foregoing embodiment. The slit may be comprised of only one generally arcuate slit encircling the through hole generally wholly, or may alternatively be comprised of more than one, arbitrary number of generally arcuate slits encircling the through hole in combination. Further, in the foregoing embodiment, the slits 61 are comprised of the inner slits 62 and outer slits 63 that are arranged in a staggered manner in an in and out direction around the through hole. However, the configuration of the slit should not be limited thereby. The slit may be comprised of a series of intermittent linear holes, like a perforation line, encircling the through hole generally wholly. In such an instance, provided in between the holes that form the perforation line are joining portions that connect the inner and outer portions of the slit. If the area of each of the joining portions is small, the slit helps prevent the peripheral area of the through hole located inside the slit from being affected by the movement of the column side panel so the sealing cloth covers the gap formed between the inner circumference of the insert hole and the outer circumference of the inflator body by the peripheral area of the through hole.

Figure 13A:
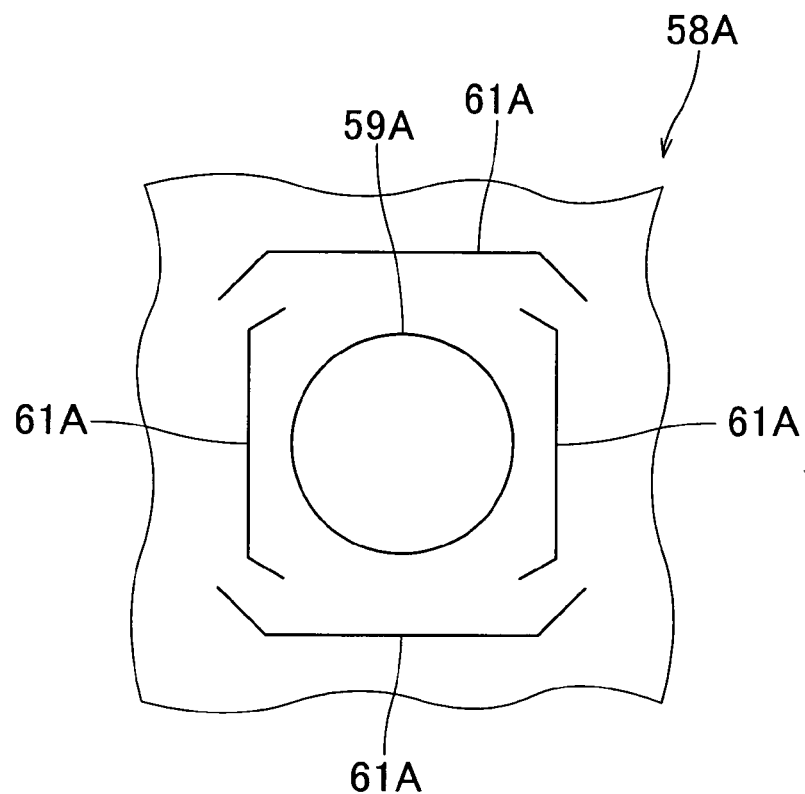
FIG. 13A is a partial enlarged plan view of a modification of the sealing cloth of the first embodiment.
Figure 13B:
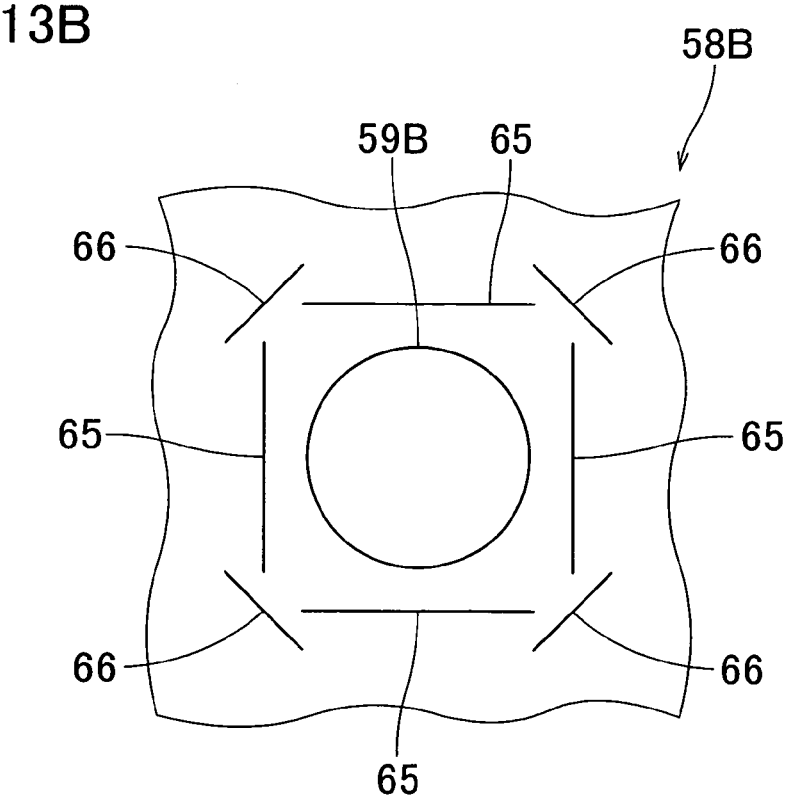
FIG. 13B is a partial enlarged plan view of another modification of the sealing cloth of the first embodiment.

Furthermore, the contour of each of the slits should not be limited to an arch like that of the first embodiment but may be straight as long as the slits are arranged to encircle the through hole generally wholly in a circumferential direction. For instance, FIG. 13A shows an alternative embodiment of the slits in which each of four slits 61A arranged generally all around the through hole 59A is formed into a large bracket-like shape. It will also be appreciated that, as in a sealing cloth 58B shown in FIG. 13B, the slits includes four straight slits 65 in radial arrangement about the through hole 59B and encircling the through hole 59B and four straight supplementary slits 66 located on the outside of and in between the slits 65, such that the slits 65 and 66 encircle the through hole 59B generally wholly in a circumferential direction.

The sealing cloth 58 can be coupled to the bag body 48 only by laying the cloth 58 on a predetermined location of the column side panel 50 and stitching the front edge 58a and rear edge 58b to the panel 50. Preparation is therefore easier than a later-described sealing cloth 92 of second embodiment and thus simplifying the manufacturing process.

Figure 14:
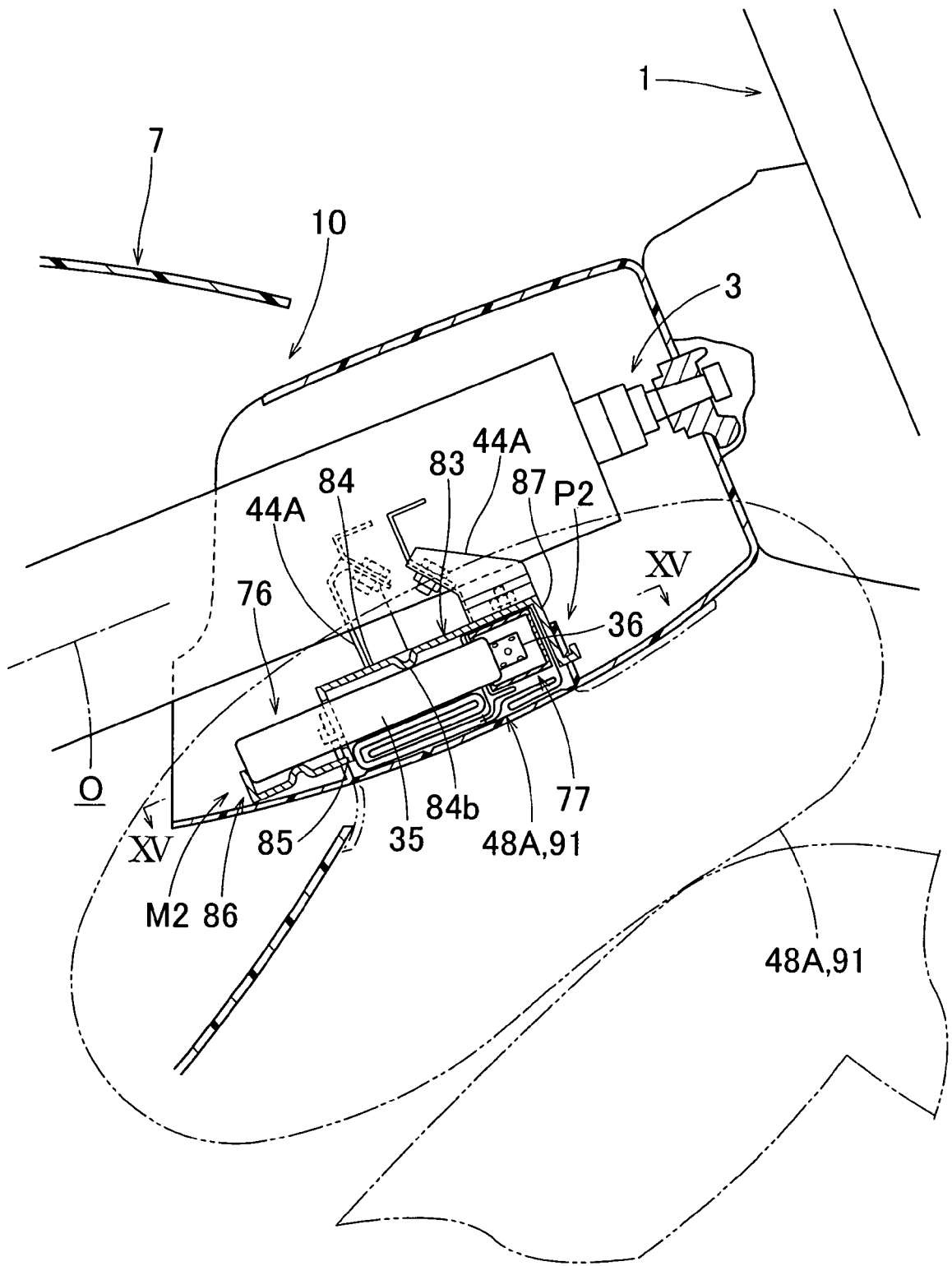
FIG. 14 is a schematic enlarged vertical section of the vicinity of a column cover where a knee-protecting airbag apparatus according to the second embodiment of the invention is mounted, taken along an anteroposterior direction.

The second embodiment of the invention is now described. A knee-protecting airbag apparatus M2 according to the second embodiment is housed in a lower space 16a inside the column cover 16 as in the first embodiment, as shown in FIG. 14. The airbag apparatus M2 includes an airbag 91, an inflator 76 and a case 83 that houses the airbag 91 and inflator 76. The airbag apparatus M2 has a generally identical structure to that of the airbag apparatus M1 of the first embodiment except in the configuration of a sealing cloth 92 applied to the airbag 91 and in the orientation of a body 35 of the inflator 76. Moreover, the column cover 16 has an identical structure to that of the first embodiment. Therefore, descriptions of common members will be omitted by assigning common reference numerals. In the second embodiment, too, the housing area P2 that houses the airbag 91 and inflator 76 is defined by the left section 26 and right section 27 of the door 24, the left door section 30 and right door section 31 of the auxiliary door 28, on the lateral, by later-described end walls 85 and 87 of the case 83, at the front and rear, likewise by a later-described ceiling wall 84 of the case 83 on the top side, and by the lower section 25 of the door 24 and lower door section 29 of the auxiliary door 28 at the bottom, as shown in FIGS. 14 and 15.

Figure 15:
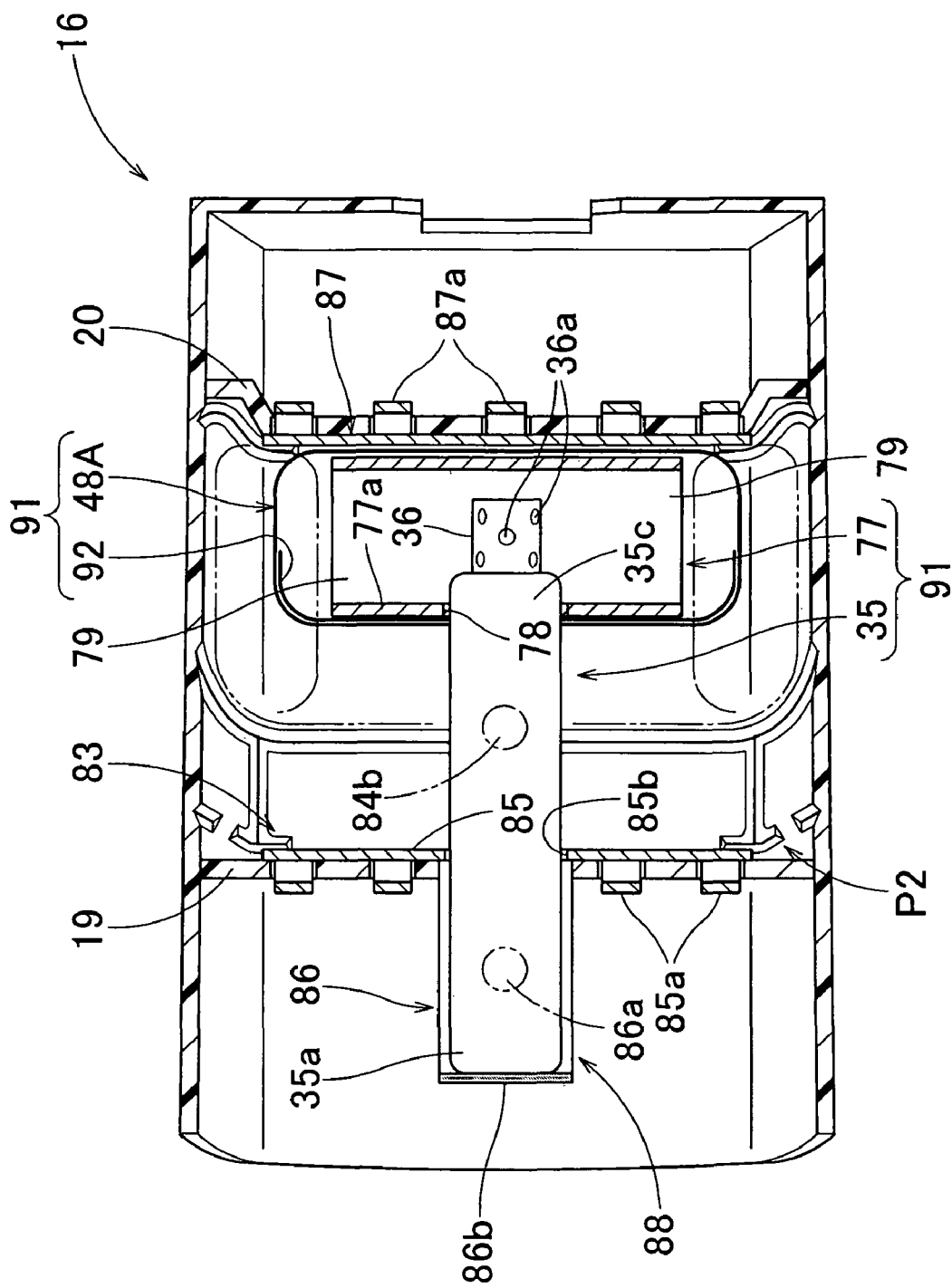
FIG. 15 is a schematic enlarged horizontal section of the vicinity of the column cover of FIG. 14 taken along line XV-XV of FIG. 14.
Figure 16:
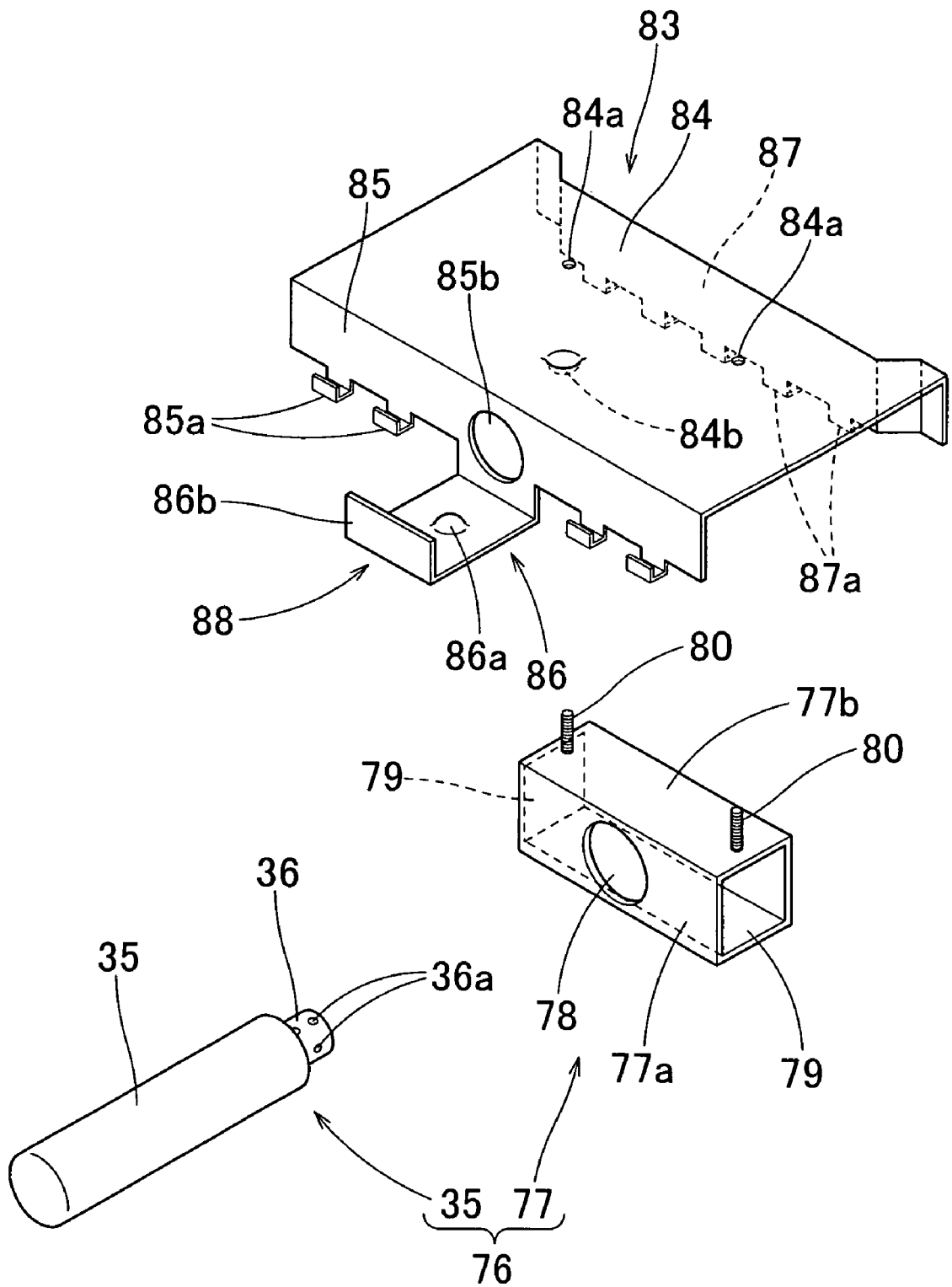
FIG. 16 is an exploded perspective view of a case and an inflator used for the airbag apparatus of the second embodiment.

As shown in FIGS. 14 to 16, the inflator 76 includes a body 35, a head 36 located at the leading end of the body 35 and provided with gas discharge ports 36a and a diffuser 77 that controls outflow direction of inflation gas discharged from the discharge ports 36a. The body 35 has an identical structure to that in the first embodiment, and therefore, its descriptions will be omitted by assigning common reference numerals to common members and parts. In the second embodiment, the inflator body 35 is arranged to extend along an anteroposterior direction, i.e., along the axial direction O of the steering column 3, such that the head 36 is located on the rear end.

Figure 19A:
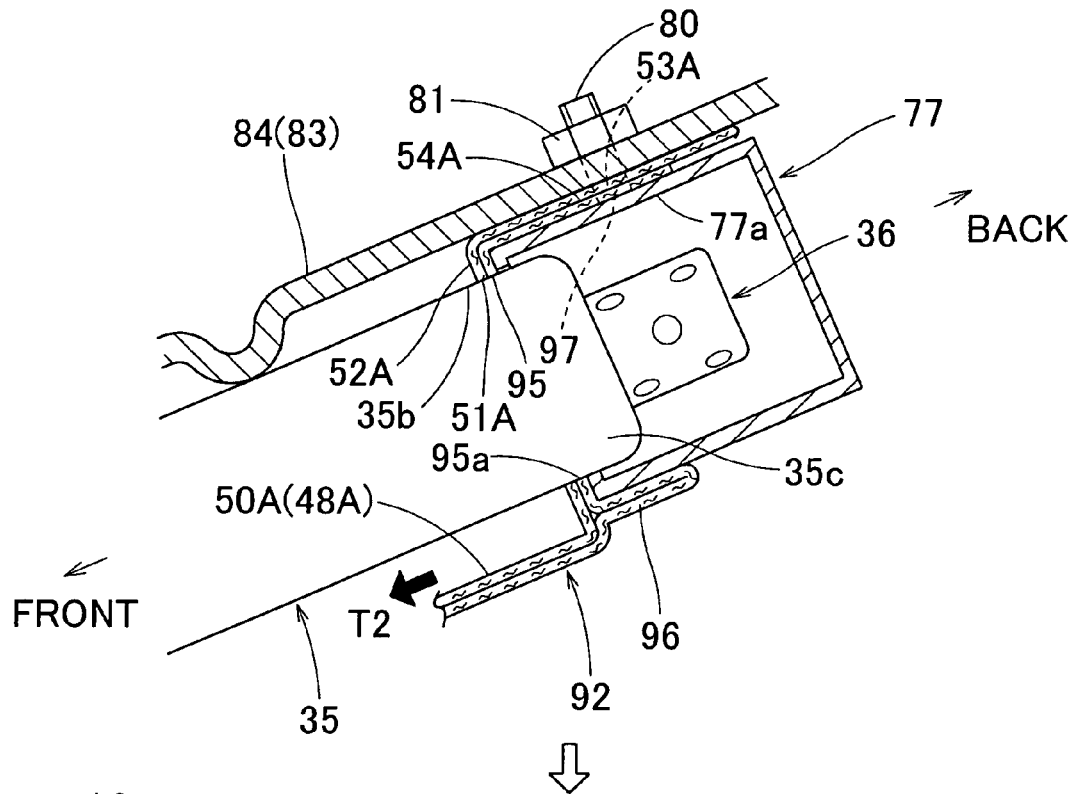
FIGS. 19A and 19B are partial enlarged vertical sections illustrating the behavior of the sealing cloth of FIG. 18 at operation of the airbag apparatus.

The diffuser 77 is located proximate the rear end of the inflator 76 for redirecting inflation gas in such a manner as to cover outer circumferences of the head 36 and a portion of the body 35 proximate the head 36 (i.e. a rear end region 35c). The diffuser 77 is made of a sheet metal and formed into a generally square tube arranged to extend along a left and right direction and having openings at the left and right ends. These openings act as outlet ports 79 that feed inflation gas into the airbag 91 (bag body 48A) along a left and right direction (FIGS. 15 and 16). The diffuser 77 includes at the vicinity of the center in a left and right direction of the front wall 77a an assembly hole 78 for receiving the head 36 and rear end region 35c of the inflator body 35, which is round. Two bolts 80 for attachment of the inflator 76 to the case 83 are disposed side by side along a left and right direction on the ceiling wall 77b of the diffuser 77. The inflator 76 of the second embodiment is secured to the case 83 forming the housing area P2 in such a condition that the region proximate the rear end region 35c is located at inner circumferences 51a and 95a of the insert hole 51A of the bag body 48A and through hole 95 of the sealing cloth 92 whereas the root end region 35a (FIG. 15) protrudes from the insert hole 51A of the bag body 48A (FIGS. 15 and 19).

Referring to FIGS. 14 to 16, the case 83 acting as the housing area P2 is made of sheet metal and has a generally inverted U-shaped section. The case 83 includes a ceiling wall 84 and end walls 85 and 87 extending downward from front and rear edges of the ceiling wall 84. Similarly to the end walls 42 and 43 of the case 40 of the first embodiment, each of the end walls 85 and 87 is provided with a plurality of retaining lugs 85a/87a each having a generally J-shaped section. The retaining lugs 85a and 87a are put into unillustrated slots formed on the end walls 19 and 20 of the column cover 16 for joint with the end walls 19 and 20. The ceiling wall 84 is provided with through holes 84a for receiving the bolts 80 of the diffuser 77.

Referring to FIGS. 15 and 16, the case 83 further includes a holding portion 88 that helps hold the inflator 76 easily. The holding portion 88 includes a support bed 86, support projections 84b and 86a, an insert hole 85b and a holding tongue 86b. The insert hole 85b is located at the center in a left and right direction of the front end wall 85 and has such a dimension that is capable of holding the inflator body 35. The support bed 86 extends forward in parallel to the ceiling wall 84 from the lower edge of the region of the end wall 85 below the insert hole 85b. The holding tongue 86b is formed at the front end of the support bed 86 in such a manner as to extend upward. The support projection 84b is so formed as to project downward at the vicinity of the center in an anteroposterior direction of the ceiling wall 84 at the rear of the insert hole 85b whereas the support projection 86a projects upward from the vicinity of the center in an anteroposterior direction of the support bed 86. The holding tongue 86b positions the root end 35a of the inflator body 35 and the support projections 84b and 86a abut against and support the body 35 from above and below. With this holding portion 88, when the bolts 80 of the diffuser 77 are nut 81 fastened to the ceiling wall 84 of the case 83, the assembly hole 78 of the diffuser 88 pushes and lift the rear end 35c of the inflator body 35 by the inner circumference, such that the support projections 84b and 86a function like a lever and securely clamp the body 35 from above and below, and thus securing the inflator 76 to the case 83 tightly. As shown in FIG. 14, the case 83 of the second embodiment also includes on the ceiling wall 84 mounting brackets 44A that attach the case 83 to the column tube 5.

Figure 17:
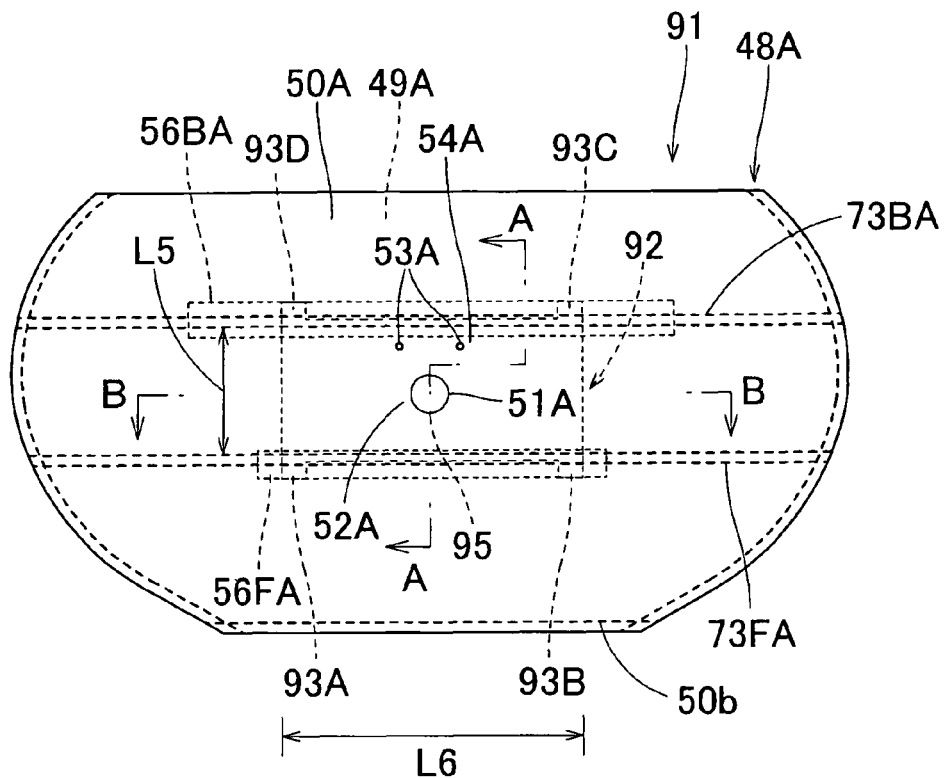
FIG. 17 is a plan view of an airbag used for the airbag apparatus of the second embodiment.
Figure 17:
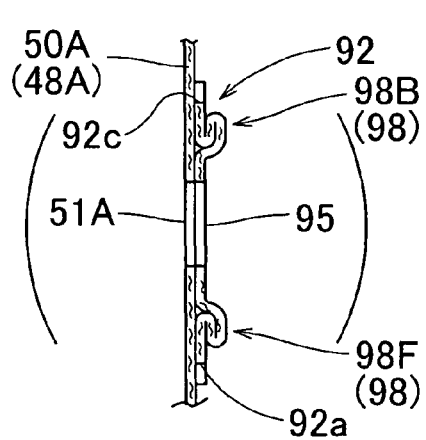
Figure 17:
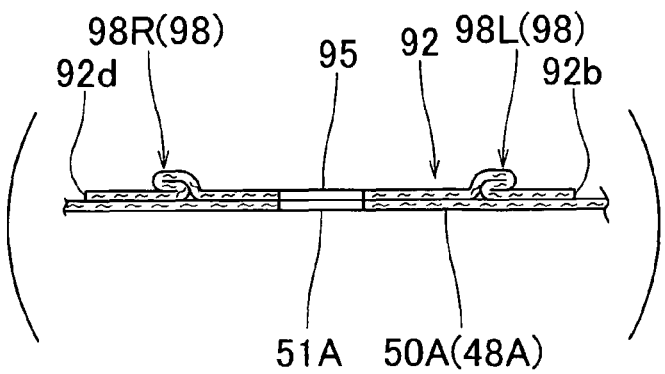

As shown in FIG. 17, the airbag 91 includes a bag body 48A, a sealing cloth 92 and two tethers 56FA and 56BA located inside the bag body 48A. The tethers 56FA and 56BA have identical structures to the tethers 56F and 56B of the airbag 47 of the first embodiment, and therefore, detailed descriptions of those will be omitted. The bag body 48A has a similar structure to the bag body 48 of the airbag 47 except in locations of the insert hole 51A and mounting holes 53A, and therefore, detailed descriptions will be omitted by assigning a reference code "A" to the end of the reference numerals of common parts. The bag body 48A includes at the vicinity of the center both in a vertical direction and in a left and right direction on the column side panel 50A an insert hole 51A for receiving the inflator body 35. Mounting holes 53A for receiving the bolts 80 of the diffuser 77 are located above the insert hole 51A (i.e. at the rear of the insert hole 51A, when on board). The area around the mounting holes 53A on the column side panel 50A of the bag body 48A acts as a mounting area 54A at which area the airbag 91 is mounted to the case 83 or housing area P2, as well as in the first embodiment. Specifically, as shown in FIG. 19, when the bolts 80 of the diffuser 77 are nut fastened to the ceiling wall 84 of the case 83, the mounting area 54A is clamped between the diffuser 77 and ceiling wall 84, and thus mounting the airbag 91 to the case 83.

Figure 19B:
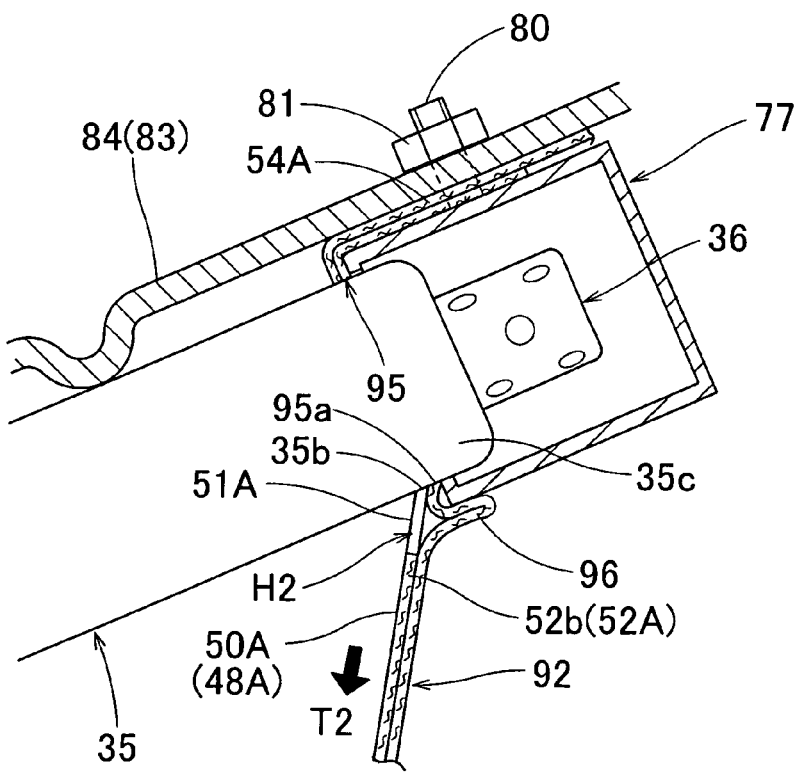

The airbag 91 (bag body 48A) is secured to the housing area P2 at the upper region (at the rear region, when on board) of the insert hole 51A. That is, the insert hole 51A is located on a front area of the mounting holes 53A, in other words located between the mounting holes 53A (mounting area 54A) and the front edge 50b on the column side panel 50 as shown in FIG. 17. With this configuration, when the column side panel 50A unfolds and unfurls in four directions (i.e. toward the front, rear, left and right) upon airbag deployment, the peripheral area 52A of the insert hole 51A is subjected to a tensile force T2 that pulls the peripheral area 52A forward and to the left and right, especially forcefully forward (FIG. 19B).

Similarly to the first embodiment, the sealing cloth 92 is made of a flexible woven fabric of polyester, polyamide or the like alike the bag body 48A. It has a rectangular plate shape and is arranged to cover the vicinity of the insert hole 51A as shown in FIG. 17. The cloth 92 includes at locations corresponding to the insert hole 51A and mounting holes 53A of the bag body 48A a through hole 95 and apertures 97, and the through hole 95 is located at the center in an anteroposterior direction and in a left and right direction of the cloth 92. At four corners of the cloth 92 are mounting tongues 93 (93A, 93B, 93C and 93D) projecting forward and rearward, in generally radial arrangement about the through hole 95. The cloth 92 is sewn to the column side panel 50A only at the mounting tongues 93. In this specific embodiment, the cloth 92 is sewn to the column side panel 50A by seams 73FA and 73BA that sew the tethers 56FA and 56BA to the column side panel 50A together with the mounting tongues 93.

Figure 18:
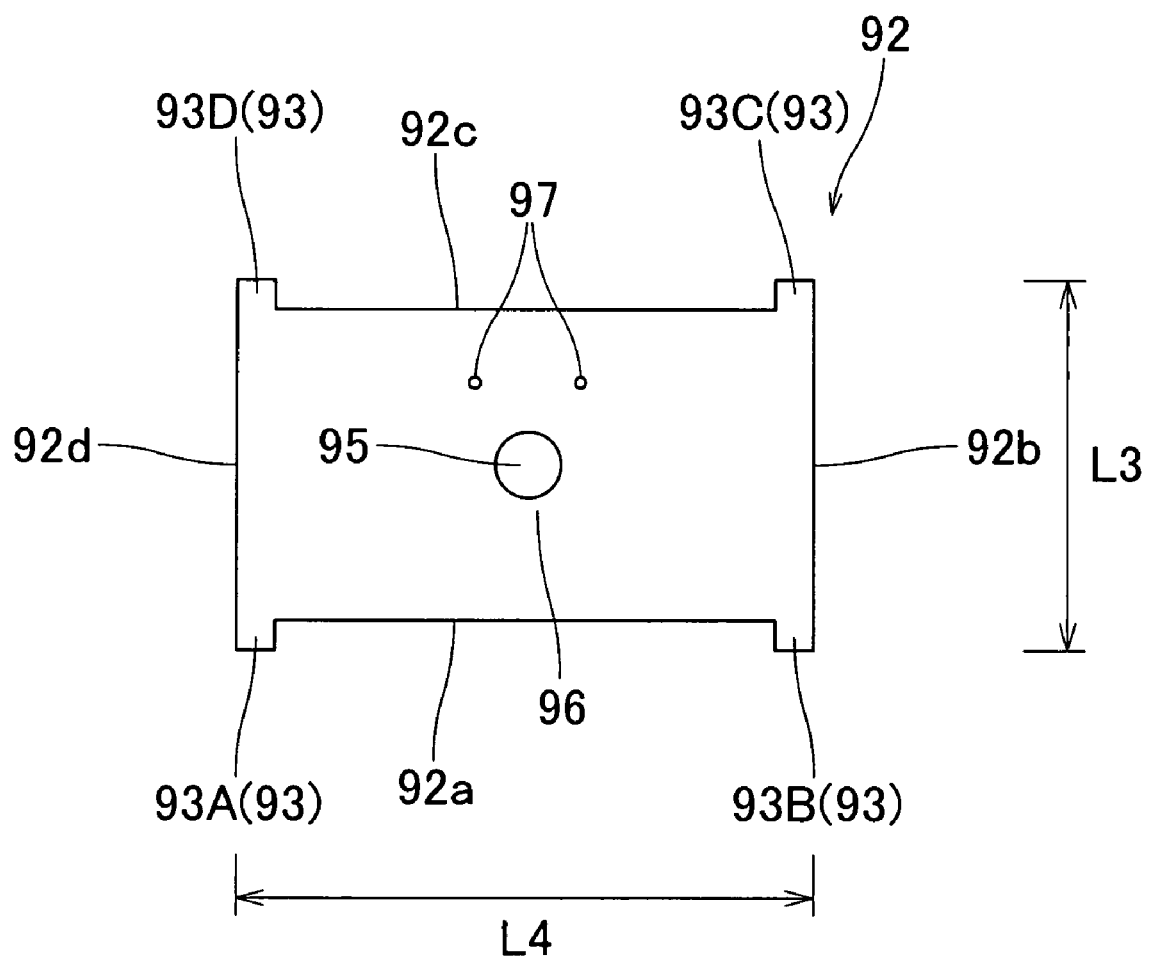
FIG. 18 is a plan view of a sealing cloth used for the airbag of FIG. 17, as is flattened.

The sealing cloth 92 as sewn to the column side panel 50A has slacks in between the mounting tongues 93. Specifically, referring to FIGS. 17 and 18, the dimension L3 in an anteroposterior direction and the dimension L4 in a left and right direction of the sealing cloth 92 as flattened by itself are greater than the dimensions L5 and L6 as sewn to the column side panel 50A. Slacks 98F, 98L, 98B and 98R are respectively located at the front hem 92a which extends between the mounting tongues 93A and 93B, at the left hem 92b which extends between the mounting tongues 93B and 93C, at the rear hem 92c which extends between the mounting tongues 93C and 93D and at the right hem 92d extending between the mounting tongues 93D and 93A. These slacks 98F, 98L, 98B and 98R are formed over entire areas in an anteroposterior directions and in a left and right directions of the sealing cloth 92 when the cloth 92 is sewn to the column side panel 50A by four corners. The dimensions of the slacks 98F, 98L, 98B and 98R are so determined as to cover up a gap H2 (FIG. 19B) which would arise between an inner circumference 51a of the insert hole 51A and an outer circumference 35b of the inflator body 35 due to the tensile force T2 acting on the peripheral area 52A of the insert hole 51A of the bag body 48A upon airbag deployment. Taking the maximum width of the gap H2 into account, the dimension of each of the slacks 98F, 98L, 98B and 98R in this specific embodiment is set at about 10 mm.

The bag body 48A of the second embodiment includes the sealing cloth 92 arranged to cover the peripheral area 52A of the insert hole 51A on the inner circumference of the bag body 48A, and the cloth 92 is sewn to the column side panel 50A of the bag body 48A at the mounting tongues 93 formed at four corners of the cloth 92 in a generally radial arrangement about the through hole 95 while provided with the slacks 98F, 98L, 98B and 98R at each hem (at the front hem 92*a*, left hem 92*b*, rear hem 92*c* and right hem 92*d*) relative to the bag body 48A. With this configuration, even in the event that the tensile force T2 acts on the peripheral area 52A of the insert hole 51A toward the deployment direction of the airbag 91 from the mounting area 54A, and tries to pull the sealing cloth 92 as well, the cloth 92 deals with the tensile force T2 by stretching out in such a manner as to unslacken the slacks 98, such that the peripheral area 96 of the through hole 95 of the sealing cloth 92 is not pulled by the tensile force T2 and stays in close contact with the outer circumference 35*b* of the inflator body 35. As a result, the sealing cloth 92 covers the gap H2 formed between the inner circumference 51*a* of the insert hole 51A and the outer circumference 35*b* of the inflator 76 by the peripheral area 96 of the through hole 95 as shown in FIG. 19B.

Moreover, since the sealing cloth 92 is sewn to the bag body 48A at the mounting tongues 93 formed at four corners of the cloth 92 in a generally radial arrangement about the through hole 95 while provided with the slacks 98F, 98L, 98B and 98R at each hem (at the front hem 92*a*, left hem 92*b*, rear hem 92*c* and right hem 92*d*) relative to the bag body 48A, even in the event that the direction of action of the tensile force T2 varies during airbag deployment, for example changes toward a direction generally orthogonal to the deployment direction of the airbag 91, the peripheral area 96 of the through hole 95 is not pulled by the tensile force T2 and the peripheral area 96 covers the gap H2 formed between the inner circumference 51*a* of the insert hole 51A and the outer circumference 35*b* of the inflator body 35. For example, assuming an instance in which a leftward tensile force acts on the column side panel 50A in FIG. 17, the sealing cloth 92 responds to the tensile force by stretching in such a manner as to take up the slack 98R. Assuming on the contrary an instance where a rightward tensile force acts on the column side panel 50A in the drawing, the sealing cloth 92 responds to the tensile force by stretching in such a manner as to take up the slack 98L. That is, the peripheral area 96 of the through hole 95 is not affected by such tensile forces in either case. As a consequence, the insert hole 51A of the bag body 48A is prevented from leaking inflation gas which has once flown into the bag body 48A, and therefore improving gas seal property in the periphery of the insert hole 51A.

Therefore, in the knee-protecting airbag apparatus M2 according to the second embodiment of the invention as well, the airbag 91 has an enhanced gas seal at the peripheral area 52A of the insert hole 51A for receiving the inflator 76 which is subjected to the tensile force T2, and is capable of preventing gas leak from the peripheral area 52A as much as possible.

Figure 20:
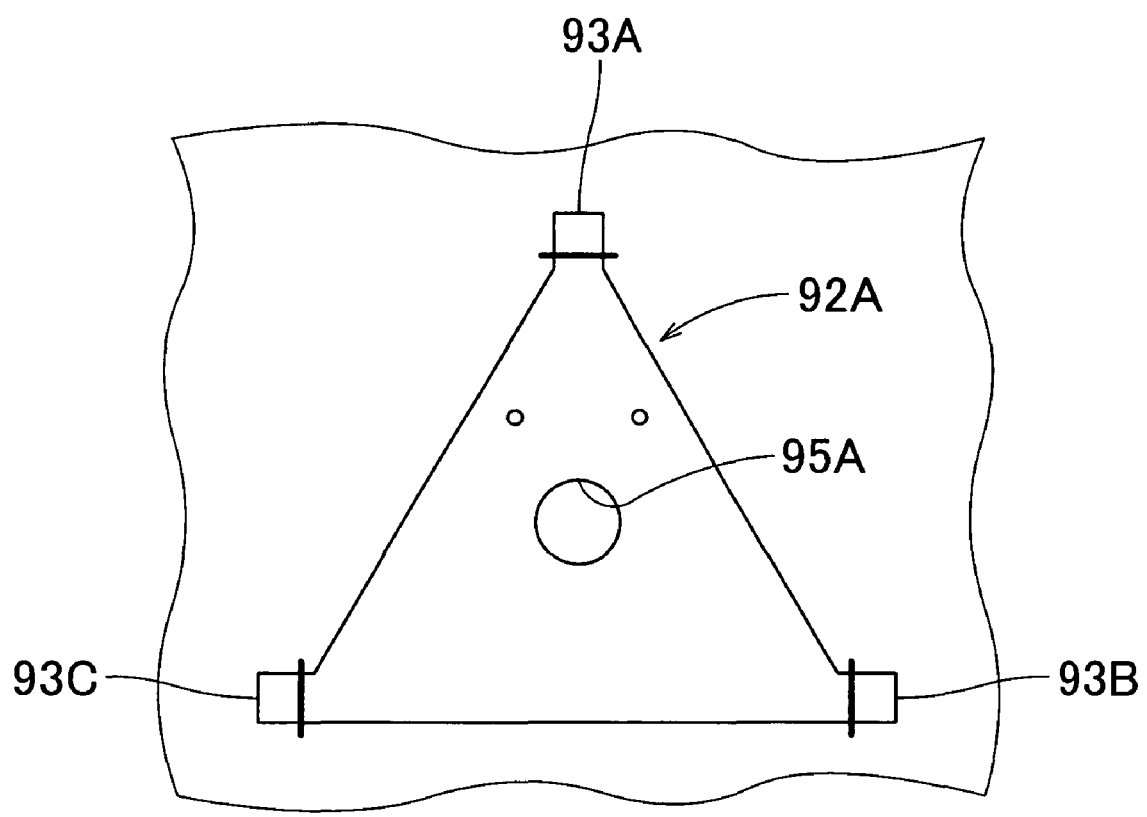
FIG. 20 is a partial enlarged plan view of a modification of the sealing cloth of the second embodiment.

Although the sealing cloth 92 of the second embodiment has been described as sewn to the column side panel 50A at four mounting tongues 93 located generally radially about the through hole 95, the number of joints of the sealing cloth to the column side panel should not be limited thereby. For instance, referring to a sealing cloth 92A illustrated in FIG. 20, it will also be appreciated that the sealing cloth 92A is prepared in the form of a generally triangle and provided at the vicinity of three angles with mounting tongues 93A, 93B and 93C formed generally radially about the through hole 95A, and that the sealing cloth 92A is coupled to the column side panel by such mounting tongues 93A, 93B and 93C. Further alternatively, the sealing cloth may be provided with five or more parts for connection to the column side panel although not shown in the figure. In any of these alternatives, the sealing cloth as sewn to the column side panel has slacks on the hems extending in between the mounting tongues.

Although the airbag apparatuses M1 and M2 in the foregoing embodiments have been described as constructed for knee protection, the application of the present invention should not be limited thereby. The invention can be applied to a side impact airbag apparatus which is mounted on a lateral of a seat of a vehicle.

What is claimed is:

1. An airbag apparatus comprising:
  a housing,
  an inflator secured to the housing and having a generally columnar shape, the inflator including at a first end discharge ports for emission of inflation gas; and
  an airbag secured to and housed in the housing in a folded up configuration, the airbag including:
    a bag body constituting an outer circumferential wall of the airbag and inflatable with inflation gas, the bag body including an insert hole that receives the inflator such that a region of the inflator on the side of the first end provided with the discharge ports is housed inside the airbag and secures the bag body to the housing whereas a region of the inflator on the side of a second end projects out of the insert hole; and
    a sealing cloth having flexibility and so connected to the bag body as to cover a peripheral area of the insert hole on an inner circumference of the bag body for providing gas seal at the insert hole of the bag body, the sealing cloth including a through hole for receiving the inflator on a location corresponding to the insert hole of the bag body and at least one slit that encircles the through hole generally wholly in a circumferential direction and enables relative slip movement between a peripheral area of the through hole on the sealing cloth and the peripheral area of the insert hole on the bag body in generally radial directions about the through hole.

2. The airbag apparatus according to claim 1, wherein the at least one slit comprises a plurality of slits that are arranged generally radially about the through hole in such a manner as to encircle the through hole in combination.

3. The airbag apparatus according to claim 1, wherein the at least one slit is so curved in a generally arcuate fashion as to encircle the through hole.

4. The airbag apparatus according to claim 3, wherein the at least one slit comprises a plurality of slits that are arranged generally radially about the through hole.

5. The airbag apparatus according to claim 4, wherein:
  the slits are arranged in a staggered manner in an in and out direction around the through hole such that opposite ends of any of the slits overlap with both of adjacent slits in an in and out direction about the through hole.

6. The airbag apparatus according to claim 1 designed for use in front of a seat of a vehicle for protecting knees of an occupant.

* * * * *